United States Patent
Mahath et al.

(10) Patent No.: US 12,204,743 B2
(45) Date of Patent: Jan. 21, 2025

(54) USER INTERFACE ADJUSTMENTS FOR ERGONOMIC DEVICE GRIP

(71) Applicant: Motorola Mobility LLC, Chicago, IL (US)

(72) Inventors: Somina Lakshmana Hanuman Mahath, Bangalore (IN); Priya Krishnamurthy, Mysuru (IN); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/649,404

(22) Filed: Apr. 29, 2024

(65) Prior Publication Data
US 2024/0377935 A1 Nov. 14, 2024

Related U.S. Application Data

(63) Continuation of application No. 18/109,573, filed on Feb. 14, 2023, now Pat. No. 11,972,100.

(51) Int. Cl.
| | |
|---|---|
| *G06F 3/04845* | (2022.01) |
| *G06F 3/041* | (2006.01) |
| *G06F 3/0482* | (2013.01) |
| *G06F 3/0485* | (2022.01) |
| *G06F 3/0488* | (2022.01) |

(52) U.S. Cl.
CPC ........ *G06F 3/04845* (2013.01); *G06F 3/0414* (2013.01); *G06F 3/0416* (2013.01); *G06F 3/0482* (2013.01); *G06F 3/0485* (2013.01); *G06F 3/0488* (2013.01)

(58) Field of Classification Search
CPC .... G06F 3/0414; G06F 3/0416; G06F 3/0482; G06F 3/0485; G06F 3/0488
USPC .................................................. 345/173, 174
See application file for complete search history.

(56) References Cited

U.S. PATENT DOCUMENTS

| | | | |
|---|---|---|---|
| 11,972,100 B1 | 4/2024 | Mahath et al. | |
| 2017/0079416 A1 | 3/2017 | Mick et al. | |
| 2020/0371598 A1* | 11/2020 | Sadarangani | ........ A61B 5/0295 |
| 2021/0275807 A1 | 9/2021 | Bouton | |
| 2023/0152912 A1* | 5/2023 | Velayudham | ........... G06F 3/041 |
| | | | 345/173 |

OTHER PUBLICATIONS

U.S. Appl. No. 18/109,573, "Non-Final Office Action", U.S. Appl. No. 18/109,573, Oct. 13, 2023, 13 pages.
U.S. Appl. No. 18/109,573, "Notice of Allowance", U.S. Appl. No. 18/109,573, Dec. 27, 2023, 8 pages.

* cited by examiner

*Primary Examiner* — Calvin C Ma
(74) *Attorney, Agent, or Firm* — FIG. 1 Patents

(57) ABSTRACT

In aspects of user interface adjustments for ergonomic device grip, a mobile device displays a user interface that includes one or more selectable user interface elements. Based on sensor data collected by sensors of the mobile device, a user is determined to be holding the mobile device with an ergonomically incorrect grip pattern. In response to the ergonomically incorrect grip pattern of the user being determined, the one or more selectable user interface elements are moved to a region of the user interface that facilitates the user holding the mobile device with an ergonomically correct grip pattern.

20 Claims, 13 Drawing Sheets

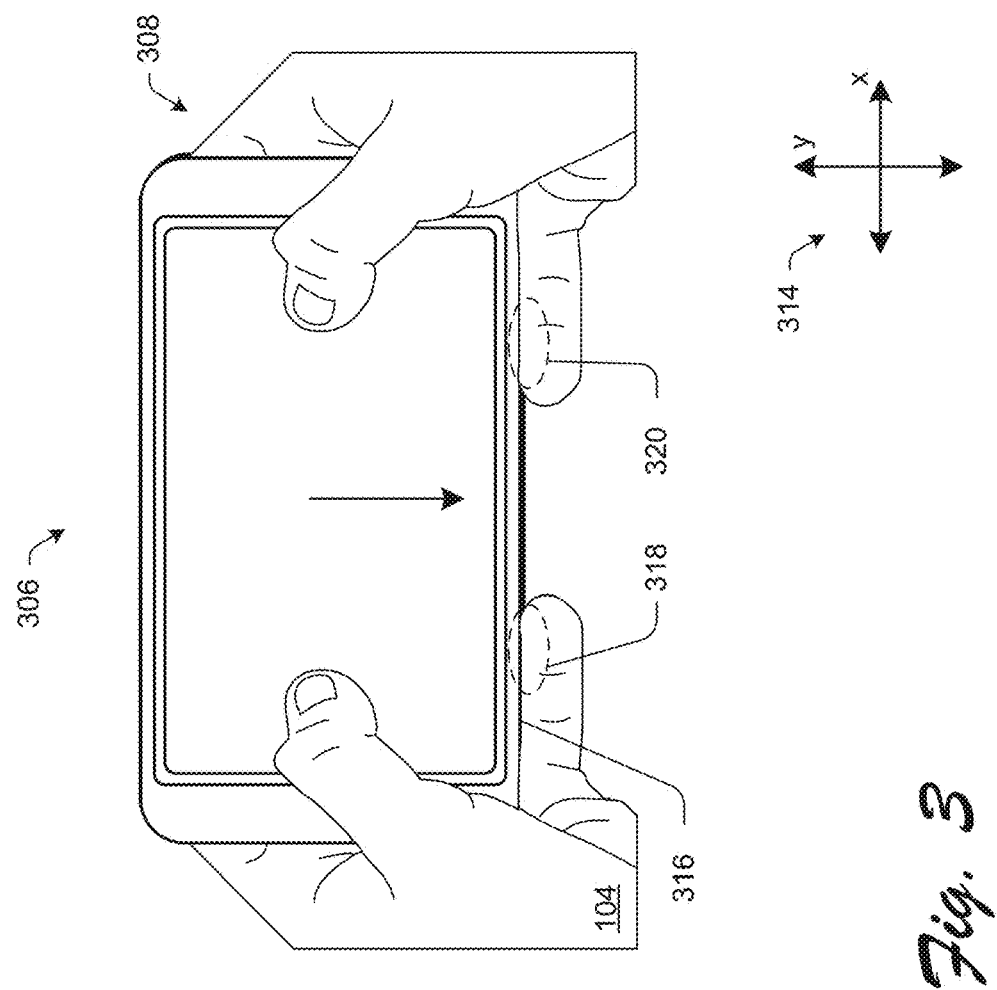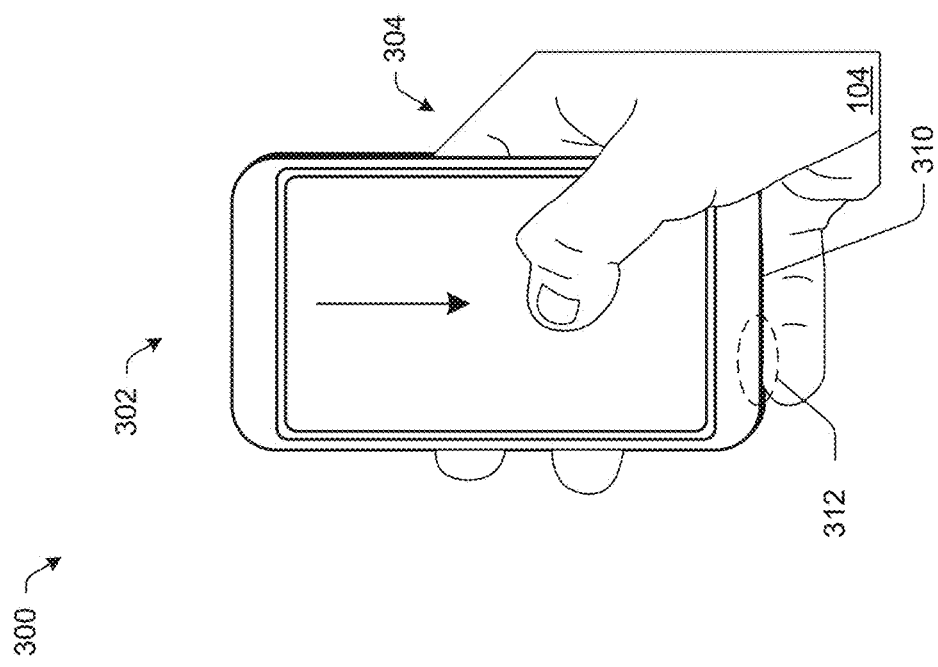
Fig. 3

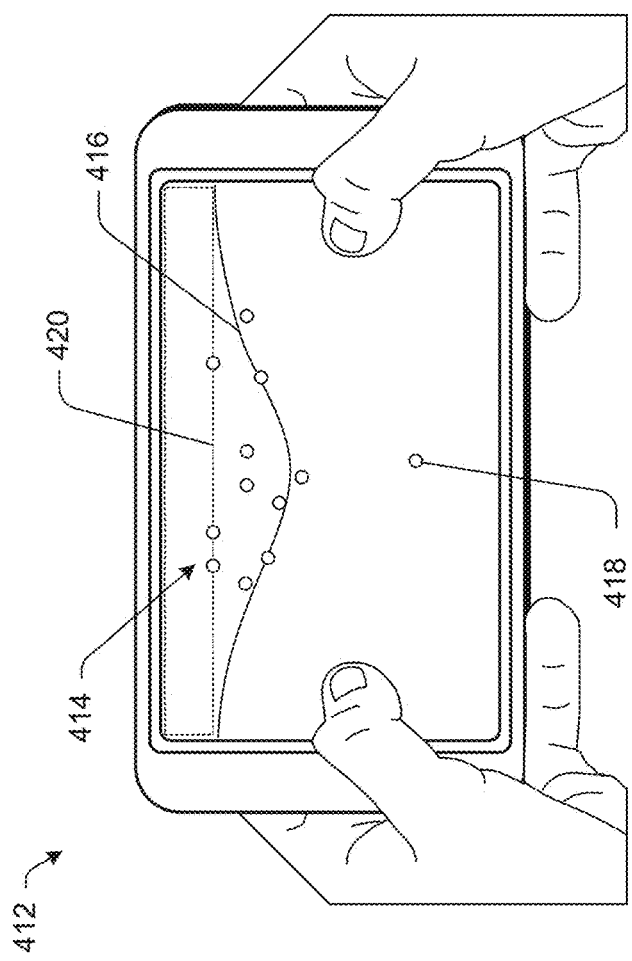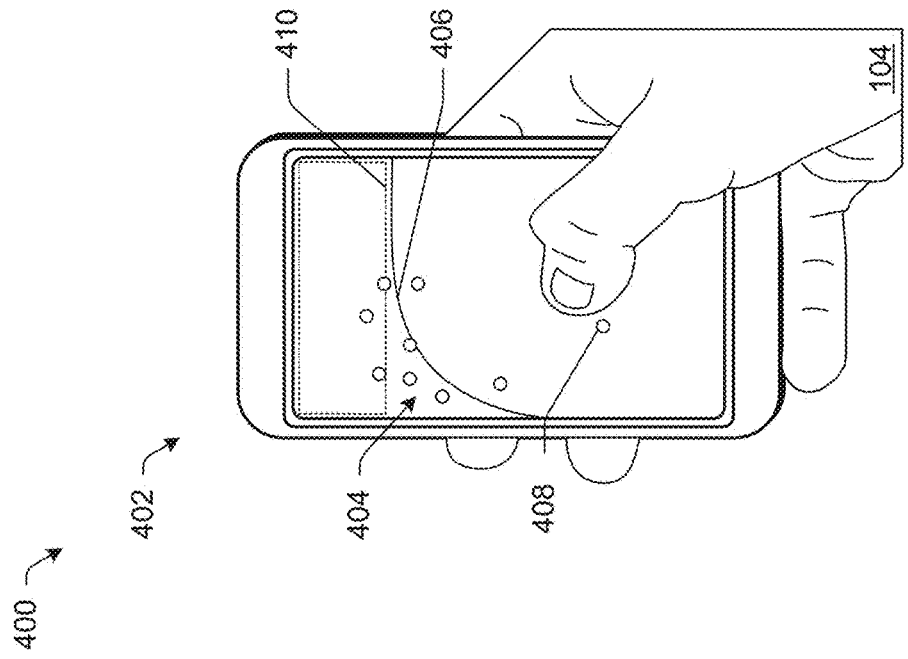
Fig. 4

USER INTERFACE ADJUSTMENTS FOR ERGONOMIC DEVICE GRIP

RELATED APPLICATIONS

This application is a continuation of and claims priority to U.S. patent application Ser. No. 18/109,573, filed Feb. 14, 2023, entitled "User Interface Adjustments for Ergonomic Device Grip," the entire disclosure of which is hereby incorporated by reference herein in its entirety.

BACKGROUND

As an increasing number of tasks become performable electronically via mobile devices, users increasingly spend more and more time holding and interacting with their mobile devices. However, there are ergonomically correct manners and ergonomically incorrect manners in which a user can hold and interact with a mobile device. Users with underlying medical conditions or injuries who interact with their mobile device in ergonomically incorrect manners are at risk of further exacerbating these medical conditions or injuries, particularly when said users interact with their mobile device for prolonged periods of time. Moreover, users without underlying medical conditions or injuries may prefer to interact with their mobile device in an ergonomic manner for reasons of comfort.

BRIEF DESCRIPTION OF THE DRAWINGS

Aspects of user interface adjustments for ergonomic device grip are described with reference to the following Figures. The same numbers may be used throughout to reference similar features and components that are shown in the Figures. Further, identical numbers followed by different letters reference different instances of features and components described herein:

FIG. 3 depicts an example showing ergonomically incorrect grip patterns in accordance with one or more implementations;

FIG. 4 depicts an example showing ergonomic regions for different device orientations in accordance with one or more implementations;

DETAILED DESCRIPTION

Figure 1:
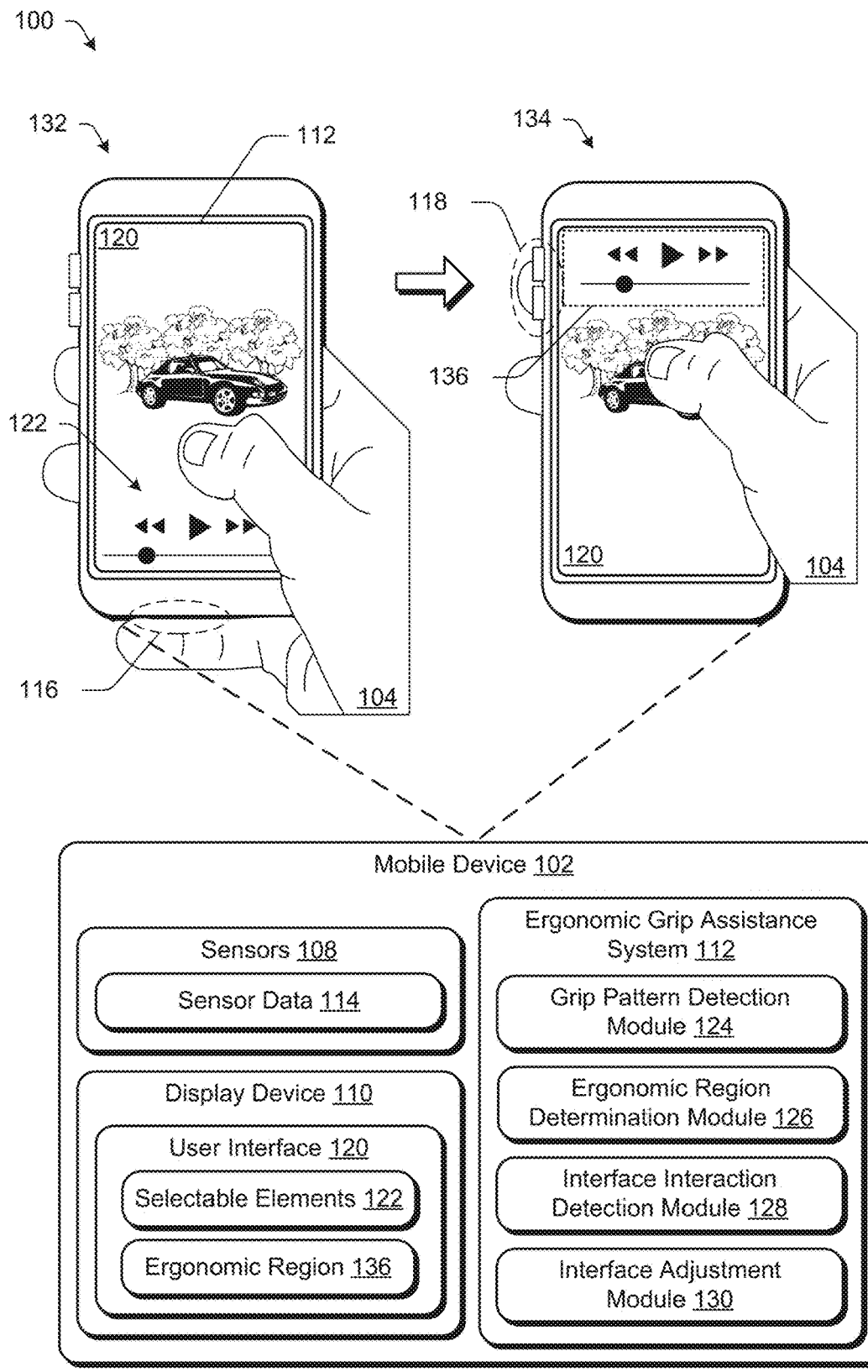
FIG. 1 illustrates an example environment in which aspects of user interface adjustments for ergonomic device grip can be implemented.

Techniques for user interface adjustments for ergonomic device grip are described herein as implemented by an ergonomic grip assistance system of a mobile device. In accordance with the described techniques, the ergonomic grip assistance system employs a grip pattern detection module to determine that a user of the mobile device is holding the mobile device with an ergonomically incorrect grip pattern. In one or more implementations, the ergonomically incorrect grip pattern corresponds to a weight of the mobile device being at least partially supported by a finger of the user positioned under a bottom edge of the mobile device. In contrast, an ergonomically correct grip pattern corresponds to the fingers of the user being tucked behind the mobile device (e.g., and contacting a back face of the mobile device rather than the bottom edge of the mobile device) such that the weight of the mobile device is not supported by a finger of the user. Notably, the ergonomically incorrect grip pattern can exacerbate medical conditions and/or injuries associated with the hand and finger that is used to support the weight of the mobile device, particularly when the user holds the mobile device with the ergonomically incorrect grip pattern for prolonged periods of time. Additionally or alternatively, users without underlying medical conditions and/or injuries associated with the hand may prefer to hold the mobile device with the ergonomically correct grip pattern for reasons of comfort. For at least this reason, the ergonomically incorrect grip pattern may be referred to as an uncomfortable grip pattern, and the ergonomically correct grip pattern may be referred to as a comfortable grip pattern.

To detect the ergonomically incorrect or uncomfortable grip pattern, the grip pattern detection module receives sensor data in the form of pressure data and orientation data. The orientation data indicates an orientation of the mobile device relative to the earth, and as a result, a direction of gravitational force exhibited by the mobile device. The pressure data indicates locations along the edges of the mobile device where pressure is applied, as well as degrees of pressure applied at the locations. Based on the orientation data, the grip detection module identifies a bottom edge of the mobile device to which the direction of gravitational force exhibited by the mobile device points to. Further, the grip pattern detection module detects the ergonomically incorrect or uncomfortable grip pattern based on a threshold percentage of the mobile device's weight being supported at one or more portions of the bottom edge of the mobile device.

In one or more implementations, the ergonomic grip assistance system employs an ergonomic region determination module to determine one or more ergonomic regions of a user interface. The ergonomic regions are portions of a user interface that are out of reach for a thumb of the user holding the mobile device with the ergonomically incorrect or uncomfortable grip pattern. Generally, a user of the mobile device holds the mobile device with a one-handed ergonomically incorrect or uncomfortable grip pattern when the mobile device has a portrait orientation, e.g., with the weight of the mobile device partially supported by a finger of the device-holding hand. Further, a user of the mobile device generally holds the mobile device with a two-handed ergonomically incorrect or uncomfortable grip pattern when the mobile device has a landscape orientation, e.g., with the weight of the mobile device supported by a finger of the right hand and a finger of the left hand.

The ergonomic region determination module receives touch data collected by a touch-sensitive display of the mobile device indicating touched locations in the user interface that are out of reach for a thumb of the user holding the mobile device with the ergonomically incorrect or uncomfortable grip pattern. Notably, a first set of the touched locations are identified and stored for when the mobile device is in the portrait orientation and held with the one-handed ergonomically incorrect or uncomfortable grip pattern, and a second set of touched locations are identified and stored for when the mobile device is in the landscape orientation and held with the two-handed ergonomically incorrect or uncomfortable grip pattern. The first set of touched locations include touched locations in the user interface that caused the user to transition from holding the mobile device with the one-handed ergonomically incorrect or uncomfortable grip pattern to holding the mobile device with an ergonomically correct or comfortable grip pattern. Additionally or alternatively, the first set of touched locations include touched locations in the user interface that caused the user to touch the touched locations with a non-device holding hand. Based on the first set of touched locations, the ergonomic region determination module determines a first ergonomic region that is out of reach for a thumb of the user holding the portrait-oriented mobile device with the one-handed ergonomically incorrect or uncomfortable grip pattern.

Further, the second set of the touched locations include touched locations in the user interface which caused the user to transition from holding the mobile device with the two-handed ergonomically incorrect or uncomfortable grip pattern to holding the mobile device with an ergonomically correct or comfortable grip pattern. Additionally or alternatively, the second set of touched locations includes touched locations in the user interface that caused the user to remove a hand from the mobile device and use the removed hand to touch the touched locations. Based on the second set of touched locations, the ergonomic region determination module determines a second ergonomic region that is out of reach for thumbs of the user holding the landscape-oriented mobile device with the two-handed ergonomically incorrect or uncomfortable grip pattern.

Moreover, the ergonomic grip assistance system employs an interface interaction detection module to determine one or more user interaction types utilized by the user to control content displayed in the user interface. In one example, the mobile device displays a user interface (e.g., of a content streaming applications) having user interface elements (e.g., a play/pause button, a fast-forward button, a rewind button, and a scrub bar) that are selectable to control content displayed in the user interface. In this example, the interface interaction detection module detects the user interaction type as the content of the user interface being controlled via user selection of the selectable elements. In another example, the mobile device displays a user interface (e.g., of a social media application) in which new or additional content is displayable by scrolling via touch and swipe inputs to the touch-sensitive display device. In this example, the interface interaction detection module detects the user interaction type as the content of the user interface being controlled by scrolling via the touch and swipe inputs.

Furthermore, an interface adjustment module of the ergonomic grip assistance system is leveraged to adjust the user interface in response to receiving an indication that the user is holding the mobile device with the ergonomically incorrect or uncomfortable grip pattern. In implementations in which the user interaction type indicates that the user interface is controlled by user selection of the selectable elements, the interface adjustment module moves the selectable elements to the ergonomic region of the user interface. In implementations in which the user interaction type indicates that the user interface is controlled by scrolling via touch and swipe inputs, the interface adjustment module adds user interface elements to the ergonomic region of the user interface that are selectable to scroll the user interface. In these implementations, the interface adjustment module additionally disables scrolling of the user interface via the touch and swipe inputs, e.g., so that scrolling of the user interface is enabled solely via user selection of the user interface elements.

Notably, the selectable elements are moved and/or the user interface elements are added to either the first ergonomic region or the second ergonomic region depending on whether the mobile device is in the portrait orientation and held with the one-handed ergonomically incorrect or uncomfortable grip pattern, or the mobile device is in the landscape orientation and held with the two-handed ergonomically incorrect or uncomfortable grip pattern. Therefore, the interface adjustment causes the user to shift his or her device grip in an upward direction (e.g., so that the weight of the mobile device is no longer supported by the user's fingers) in order to touch the moved selectable elements and/or the added user interface elements and interact with the user interface. This is because the ergonomic regions are out of reach for the thumbs of the user holding the mobile device with the ergonomically incorrect or uncomfortable grip pattern. Accordingly, the described techniques for user interface adjustments for ergonomic device grip cause the user to transition from holding the mobile device with the ergonomically incorrect or uncomfortable grip pattern to holding the mobile device with an ergonomically correct or comfortable grip pattern. By doing so, the described techniques reduce the risk of exacerbating an underlying medical condition and/or injury associated with the user's hand and/or fingers, and the described techniques further promote comfortable and ergonomic use of the mobile device.

While features and concepts of the described techniques for user interface adjustments for ergonomic device grip can be implemented in any number of different devices, systems, environments, and/or configurations, implementations of the techniques for user interface adjustments for ergonomic device grip are described in the context of the following example devices, systems, and methods.

FIG. 1 illustrates an example environment 100 in which aspects of user interface adjustments for ergonomic device grip can be implemented. The environment 100 includes a mobile device 102, which in the illustrated example, is a portable device that can be carried by a user 104, such as any type of a mobile phone, flip phone, computing device, tablet device, and/or any other type of mobile device. These examples are not to be construed as limiting, however, and the mobile device can be implemented in a variety of different ways and form factors without departing from the spirit or scope of the described techniques. Example attributes of the mobile device 102 are discussed below with reference to device 1300 of FIG. 13.

The mobile device 102 includes various functionality that enables the mobile device to perform different aspects of user interface adjustments for ergonomic device grip discussed herein, including sensors 108, a display device 110, and an ergonomic grip assistance system 112. Generally, the sensors 108 are representative of functionality to enable various types of sensor data 114 to be collected by the mobile device 102. In one or more implementations, the sensors 108 include pressure sensors to collect pressure data indicating portions of the mobile device 102 where pressure is applied, as well as corresponding degrees of pressure applied to the portions the mobile device 102. As shown in the illustrated example, for instance, the pressure data indicates a degree of pressure applied by the pinky finger of the user 104 at the location 116 on the bottom edge of the mobile device 102. As further shown in the illustrated example, the pressure data includes a degree of pressure applied by the two fingers of the user 104 at corresponding portions along an edge of the mobile device 102, as well as a degree of pressure applied by the hand of the user along a corresponding portion of an opposite edge of the mobile device 102. It is to be appreciated that, in addition to indicating locations and degrees of pressure along the edges of the mobile device 102, the pressure sensors can capture pressure data applied to different locations of the mobile device 102 (e.g., a back face, and a front face of the mobile device 102).

Additionally or alternatively, the pressure sensors are integrated components of one or more keys of the mobile device 102 to capture a pressure applied to the one or more keys. Generally, the keys, when actuated, cause a mobile device configuration adjustment, such as a volume adjustment, a mobile device lock, a mobile device unlock, etc. The pressure sensors associated with the keys collect key press data indicating a degree of pressure applied to the keys. Notably, the pressure sensors are capable of detecting applied pressure to the keys even if the applied pressure is insufficient to actuate the keys. As shown at 118 of the illustrated example, for instance, the mobile device 102 includes volume adjustment keys touched by a finger of the user 104, but with insufficient force to actuate the volume adjustment keys. Despite this, the pressure sensors associated with the volume adjustment keys detect key press data indicating applied pressure by the finger of the user 104 to the volume adjustment keys.

Additionally or alternatively, the sensors 108 include touch sensors to collect touch data indicating locations at which the user 104 touches mobile device 102. By way of example, the display device 110 is a touch-sensitive display capable of receiving touch inputs to interact with a user interface displayed on the display device 110. In one or more implementations, the touch data includes locations at which a touch event is received by the touch-sensitive display, a type of touch event received by the touch-sensitive display (e.g., a tap input, a touch and swipe input, a touch and hold input, etc.), a duration of a touch event received by the touch-sensitive display, and so on. Although examples are described herein as receiving touch data via the touch-sensitive display device 110, it is to be appreciated that, in one or more implementations, the touch sensors are capable of receiving touch data at different portions of the mobile device 102, e.g., along the edges of the mobile device 102, at a back face of the mobile device 102, at a front housing of the mobile device 102 proximate the display device 110, etc.

The display device 110, in addition to collecting the touch data, represents functionality (e.g., hardware and logic) for enabling visual output of content via the mobile device 102, such as to display a user interface 120. In one or more implementations, the user 104 interacts with the user interface 120 via selectable elements 122. As shown in the illustrated example, for instance, the display device 110 displays a content streaming user interface that includes selectable elements 122. In this example, the selectable elements 122 include a rewind button, a pause button, a fast forward button, and a scrub bar. These selectable elements 122 are generally selectable to play, pause, and/or navigate to a desired portion of streaming content displayed in the user interface 120. Additionally or alternatively, the user 104 interacts with the user interface 120 without touching selectable elements 122. Indeed, in another non-depicted example, display device 110 displays a user interface of a social media application. In this example, the user 104 scrolls to different portions of the social media content displayed in the user interface 120 via touch and swipe inputs at any portion of the user interface 120, e.g., without touching a specific user interface element.

The ergonomic grip assistance system 112 represents functionality for performing various aspects of user interface adjustments for ergonomic device grip described herein, and is illustrated as including a grip pattern detection module 124, an ergonomic region determination module 126, an interface interaction detection module 128, and an interface adjustment module 130. The ergonomic grip assistance system 112 and the corresponding modules 124, 126, 128, 130 can be implemented as separate modules that may include independent processing, memory, and/or logic components functioning as a computing and/or electronic device integrated with the mobile device 102. Alternatively or in addition, the ergonomic grip assistance system 112 and the corresponding modules 124, 126, 128, 130 can be implemented as software applications or modules, such as executable software instructions (e.g., computer-executable instructions) that are executable with a processor of the mobile device 102 to implement the techniques and features of user interface adjustments for ergonomic device grip, as described herein.

As software applications or modules, the ergonomic grip assistance system 112 and the corresponding modules 124, 126, 128, 130 can be stored on computer-readable storage memory, or in any other suitable memory device or electronic data storage implemented with the modules. Alternatively or in addition, the ergonomic grip assistance system 112 and/or the corresponding modules 124, 126, 128, 130 may be implemented in firmware and/or at least partially in computer hardware. For example, at least part of the ergonomic grip assistance system 112 and modules 124, 126, 128, 130 may be executable by a computer processor, and/or at least part of the ergonomic grip assistance system 112 and modules 124, 126, 128, 130 may be implemented in logic circuitry.

The grip pattern detection module 124 is representative of functionality to determine whether the user 104 is holding the mobile device 102 with an ergonomically incorrect grip pattern. In one or more implementations, the ergonomically incorrect grip pattern corresponds to the grip pattern generally shown at 132, in which the weight of the mobile device 102 is at least partially supported by a finger of the user 104. In contrast, an ergonomically correct grip pattern corresponds to the grip pattern generally shown at 134, in which the weight of the mobile device 102 is not supported by a finger of the user 104. Thus, the grip pattern detection module 124 detects that the user 104 is holding the mobile device 102 with the ergonomically incorrect grip pattern based on the sensor data indicating that the weight of the mobile device 102 is at least partially supported by a finger of the user 104.

Notably, the ergonomically incorrect grip pattern can exacerbate medical conditions and/or injuries associated with the hand and finger that is used to support the weight of the mobile device 102, particularly when the user holds the mobile device 102 with the illustrated ergonomically incorrect grip pattern for prolonged periods of time. Additionally or alternatively, users without underlying medical conditions and/or injuries associated with the hand may prefer to hold the mobile device 102 with the ergonomically correct grip pattern for reasons of comfort. For at least this reason, the ergonomically incorrect grip pattern, as depicted at 132, may additionally be referred to as an uncomfortable grip pattern, and the ergonomically correct grip pattern, as depicted at 134, may additionally be referred to as a comfortable grip pattern.

The ergonomic region determination module 126 is representative of functionality to determine an ergonomic region 136 of the user interface 120. Generally, the ergonomic region 136 is a portion of the user interface 120 which, when touched, facilitates the user 104 holding the mobile device 102 with the ergonomically correct grip pattern, as shown at 134. For example, the ergonomic region 136 represents a region of the user interface 120 that is out of reach for a thumb of the user while the user is holding the mobile device 102 with the ergonomically incorrect grip pattern. In the illustrated example, for instance, the user 104 cannot touch the ergonomic region 136 of the user interface 120 with the thumb of the right hand while the right hand holds the mobile device 102 with the ergonomically incorrect grip pattern. Rather, to touch the ergonomic region 136 of the user interface 120, the right hand of the user 104 either holds the mobile device 102 with the ergonomically correct grip pattern (e.g., as shown at 134), or the user 104 uses the non-device-holding hand to touch the ergonomic region 136 of the user interface 120.

The interface interaction detection module 128 represents functionality to detect a type of user interaction utilized by the user 104 to control content displayed in the user interface 120. In the illustrated example, for instance, the interface interaction detection module 128 determines that the user is controlling the content displayed in the content streaming application via user selection of the selectable elements 122. In an additional or alternative example, the interface interaction detection module 128 determines that the user 104 is scrolling the user interface 120 (e.g., of the social media application) via one or more touch and swipe inputs to the touch-sensitive display device 110.

The interface adjustment module 130 represents functionality to adjust the user interface 120 to facilitate the user 104 holding the mobile device 102 with the ergonomically correct grip pattern. By way of example, in response to the determination that the user 104 is holding the mobile device 102 with the ergonomically incorrect grip pattern and the determination that the user 104 is interacting with the user interface 120 by touching the selectable elements 122, the interface adjustment module 130 moves the selectable elements 122 to the ergonomic region 136 of the user interface 120, as shown at 134. By way of another example, in response to the determination that the user 104 is holding the mobile device 102 with the ergonomically incorrect grip pattern and the determination that the user 104 is scrolling the user interface 120 via touch and swipe inputs to the touch-sensitive display device 110, the interface adjustment module 130 adds one or more user interface elements to the ergonomic region 136 of the user interface 120 that are selectable to scroll the user interface 120. Further, the interface adjustment module 130 disables scrolling of the user interface 120 via the touch and swipe inputs.

Therefore, in order for the user 104 to interact with and control content displayed in the user interface 120, touch inputs are to be provided to the ergonomic region 136. Since the ergonomic region 136 is out of reach for the user's right thumb, the adjusted user interface configuration drives the user 104 to hold the mobile device 102 with the ergonomically correct grip pattern, as shown at 134. Thus, the described techniques cause the user 104 to transition from holding the mobile device 102 with the ergonomically incorrect grip pattern to holding the mobile device 102 with an ergonomically correct grip pattern. By doing so, the described techniques reduce the risk of exacerbating an underlying medical condition and/or injury associated with the user's hand and/or fingers, and the described techniques further promote comfortable and ergonomic use of the mobile device 102.

Having discussed an example environment in which the disclosed techniques can be performed, consider now some example scenarios and implementation details for implementing the disclosed techniques.

Figure 2:
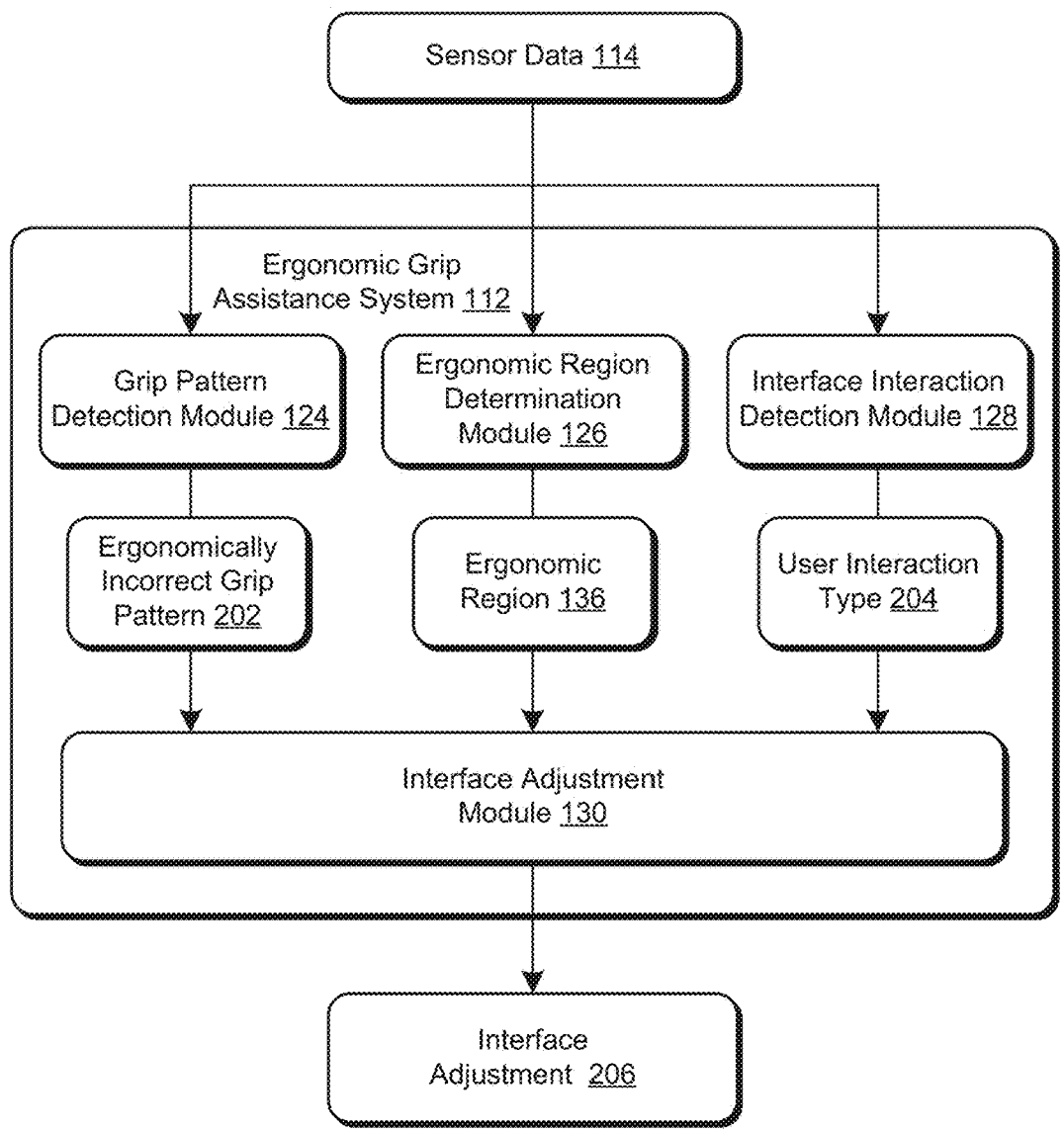
FIG. 2 depicts an example system in which aspects of user interface adjustments for ergonomic device grip can be implemented.

FIG. 2 depicts an example system 200 in which aspects of user interface adjustments for ergonomic device grip can be implemented. As shown, the grip pattern detection module 124 is employed to detect whether the user 104 is holding the mobile device with an ergonomically incorrect grip pattern 202 based on the sensor data 114. In accordance with the described techniques, the ergonomically incorrect grip pattern 202 corresponds to a device grip in which the weight of the mobile device 102 is at least partially supported by at least one finger of the user 104. To detect the ergonomically incorrect grip pattern 202, the grip pattern detection module 124 receives sensor data 114 in the form of pressure data and key press data collected by the pressure sensors disposed throughout the mobile device 102, as well as orientation data collected by a gyroscope and/or accelerometer of the mobile device 102. The pressure data indicates locations along the edges of the mobile device 102 where pressure is applied to the mobile device 102, as well as a degree of pressure applied at the locations. The orientation data indicates whether the device is held with a portrait orientation or a landscape orientation, as well as a direction of gravitational force exhibited by the mobile device.

FIG. 3 depicts an example 300 showing ergonomically incorrect grip patterns in one or more implementations. As shown at 302, the mobile device 102 has a portrait orientation. When oriented in this way, the user 104 generally holds the mobile device 102 with a one-handed ergonomically incorrect grip pattern 304, in which the mobile device 102 is held with one hand of the user 104 with the weight of the mobile device 102 being partially supported by a finger (e.g., a pinky finger) of the device-holding hand. Although depicted as held by a right hand of the user, it is to be appreciated that the one-handed ergonomically incorrect grip pattern 304 can be a similar device grip as held by a left hand of the user 104. As further shown at 306, the mobile device 102 has a landscape orientation. When oriented in this way, the user 104 generally holds the mobile device 102 with a two-handed ergonomically incorrect grip pattern 308, in which the mobile device 102 is held with two hands of the user 104 with the weight of the mobile device 102 at least partially supported by two fingers of the user 104, e.g., the right pinky finger of the user 104 and the left pinky finger of the user 104. As previously mentioned, the ergonomically incorrect grip patterns 304, 308 may additionally be referred to as uncomfortable grip patterns, e.g., for users that prefer not to use the ergonomically incorrect grip patterns 304, 308 for reasons of comfort.

In one or more implementations, the grip pattern detection module 124 determines that the mobile device 102 has the portrait orientation, as shown at 302, and the direction of gravity exhibited by the mobile device 102 (e.g., illustrated by the downward-pointing arrow), points to a bottom edge 310 of the mobile device 102. Thus, to determine the ergonomically incorrect grip pattern 202 when oriented in this way, the grip pattern detection module 124 determines that pressure is applied to a portion of the bottom edge 310 of the mobile device 102 and the degree of pressure applied at the portion corresponds to a weight of the mobile device 102.

In the illustrated example, for instance, the grip pattern detection module 124 determines that pressure is applied to the mobile device 102 at the location 312 which is on the bottom edge 310 of the mobile device 102. Further, the grip pattern detection module 124 determines that the degree of pressure applied at the location 312 is within a threshold range of a weight of the mobile device 102. For example, if the mobile device weighs sixteen ounces, then the ergonomically incorrect grip pattern 202 is detected based on the degree of pressure applied at the location 312 being between ten and sixteen ounces. Accounting for degrees of pressure that are less than the entire weight of the mobile device 102 enables the grip pattern detection module 124 to detect the ergonomically incorrect grip pattern 202 when the mobile device 102 is rotated relative to the x-axis of the depicted axes 314 and supported partially by the fingers of the user 104 behind the mobile device 102.

In some implementations, the grip pattern detection module 124 detects the ergonomically incorrect grip pattern 202 based on the location 312 where pressure is applied being less than the entire bottom edge 310. Additionally or alternatively, the grip pattern detection module 124 detects the ergonomically incorrect grip pattern 202 based on touch data (e.g., collected by touch sensors disposed along the bottom edge 310 of the mobile device 102) indicating that a finger of the user 104 is touching the location 312 where the pressure is applied. In this way, the grip pattern detection module 124 does not erroneously detect the ergonomically incorrect grip pattern 202 when the weight of the mobile device 102 is supported by an object that is not the user's finger. Based on the above-noted determinations, the grip pattern detection module 124 detects the one-handed ergonomically incorrect grip pattern 304 when the mobile device 102 has the portrait orientation.

In one or more implementations, the grip pattern detection module 124 determines that the mobile device 102 has the landscape orientation, as shown at 306, and the direction of gravity (e.g., illustrated by the downward-pointing arrow), points to a bottom edge 316 of the mobile device 102. Thus, to determine the ergonomically incorrect grip pattern 202 when oriented in this way, the grip pattern detection module 124 determines that pressure is applied at one or more portions on the bottom edge 316 of the mobile device 102 and the combined degree of pressure applied at the one or more portions corresponds to a weight of the mobile device 102.

In the illustrated example, for instance, the grip pattern detection module 124 determines that pressure is applied to the mobile device 102 at the location 318 and the location 320 which are on the bottom edge 316 of the mobile device 102. Further, the grip pattern detection module 124 determines that the combined degree of pressure applied at the locations 318, 320 is within a threshold range of a weight of the mobile device 102. For example, if the mobile device weighs sixteen ounces, then the ergonomically incorrect grip pattern 202 is detected based on the combined degree of pressure applied at the locations 318, 320 being between ten and sixteen ounces.

In some implementations, the grip pattern detection module 124 detects the ergonomically incorrect grip pattern 202 based on the locations 318, 320 where pressure is applied being less than the entire bottom edge 316. Additionally or alternatively, the grip pattern detection module 124 detects the ergonomically incorrect grip pattern 202 based on touch data (e.g., collected by touch sensors disposed along the bottom edge 316 of the mobile device 102) indicating that fingers of the user 104 are touching the locations 318, 320 where pressure is applied. In this way, the grip pattern detection module 124 does not erroneously detect the ergonomically incorrect grip pattern 202 when the weight of the mobile device 102 is supported by an object that is not a finger of the user. Based on these determinations, the grip pattern detection module 124 detects the two-handed ergonomically incorrect grip pattern 308, when the mobile device 102 has the landscape orientation.

Although the ergonomically incorrect grip pattern 202 is depicted and described as the one-handed ergonomically incorrect grip pattern 304 when the mobile device 102 has the portrait orientation, and the two-handed ergonomically incorrect grip pattern 308 when the mobile device 102 has the landscape orientation, these examples are not to be construed as limiting. Indeed, the ergonomically incorrect grip pattern 202 can be detected as the two-handed ergonomically incorrect grip pattern 308 while the mobile device 102 is in the portrait orientation. Further, the ergonomically incorrect grip pattern 202 can be detected as the one-handed ergonomically incorrect grip pattern 304 while the mobile device 102 is in the landscape orientation.

Returning to FIG. 2, the ergonomic region determination module 126 is employed to determine the ergonomic region 136 of the user interface 120 based on the sensor data 114. The ergonomic region 136 is a region of the user interface 120 which is out of reach for a thumb of the user 104 while the user 104 holds the mobile device 102 with the ergonomically incorrect grip pattern 202. To determine the ergonomic region 136 of the user interface 120, the ergonomic region determination module 126 receives start notifications from the grip pattern detection module 124 indicating when the user begins holding the mobile device 102 with the ergonomically incorrect grip pattern 202. The ergonomic region determination module 126 also receives stop notifications from the grip pattern detection module 124 indicating when the user 104 stops holding the mobile device 102 with the ergonomically incorrect grip pattern 202, and transitions to holding the mobile device 102 with the ergonomically correct grip pattern. Furthermore, the ergonomic region determination module 126 receives sensor data 114 in the form of touch data collected by the touch-sensitive display device 110 indicating locations within the touch-sensitive display device 110 where touch events are received, as well as when the touch events are received.

Based on the touch data, the ergonomic region determination module 126 identifies and stores touched locations in the user interface 120 that are out of reach for a thumb of the user 104 holding the mobile device 102 with the ergonomically incorrect grip pattern 202. Further, the ergonomic region determination module 126 identifies and stores a first set of the touched locations for the one-handed ergonomically incorrect grip pattern 304, and a second set of the touched locations for the two-handed ergonomically incorrect grip pattern 308. The first set of touched locations includes touched locations in the user interface 120 which caused the user 104 to stop holding the mobile device 102 with the one-handed ergonomically incorrect grip pattern 304. For example, in response to receiving a stop notification indicating that the user transitions away from holding the mobile device 102 with the one-handed ergonomically incorrect grip pattern 304, the ergonomic region determination module 126 monitors for one or more subsequent touch events. If a subsequent touch event is received within a threshold amount of time, then the location of the touch event is identified and stored as a touched location that is out of reach for a thumb of the user 104 holding the mobile device 102 with the one-handed ergonomically incorrect grip pattern 304.

In one or more implementations, the first set of touched locations also include locations in the user interface 120 which caused the user 104 to touch the touched locations with a non-device-holding hand. By way of example, the mobile device 102 maintains (e.g., in memory) fingerprint data associated with the user 104 which is usable to identify a finger with which a touch event is provided. Thus, in response to receiving a start notification indicating that the user is holding the mobile device with the one-handed ergonomically incorrect grip pattern 304, the ergonomic region determination module 126 monitors for one or more subsequent touch events. Further, while the user is holding the device with the one-handed ergonomically incorrect grip pattern 304, the ergonomic region determination module 126 determines that at least a threshold number or percentage of touch events are received as input with a thumb of the device-holding hand, and at least one additional touch event is received as input with a finger of the non-device-holding hand. In response, the ergonomic region determination module 126 identifies and stores the location of the at least one additional touch event as a touched location that is out of reach for a thumb of the user 104 holding the mobile device 102 with the one-handed ergonomically incorrect grip pattern 304. By identifying the touched location based on the threshold percentage of touch events being received with the thumb of the device-holding hand, the ergonomic region determination module 126 does not erroneously identify the touched locations when the user 104 chooses to interact with the mobile device 102 with the non-device holding hand.

The second set of touched locations includes touched locations in the user interface 120 which caused the user 104 to stop holding the mobile device 102 with the two-handed ergonomically incorrect grip pattern 308. For example, in response to receiving a stop notification indicating that the user transitions away from holding the mobile device 102 with the two-handed ergonomically incorrect grip pattern 308, the ergonomic region determination module 126 monitors for one or more subsequent touch events. If a subsequent touch event is received within a threshold amount of time, then the location of the touch event is identified and stored as a touched location that is out of reach for a thumb of the user 104 holding the mobile device 102 with the two-handed ergonomically incorrect grip pattern 308.

Additionally or alternatively, the second set of touched locations also include touched locations in the user interface 120 which caused the user 104 to remove one hand from the mobile device 102 and use the removed hand to touch the touched locations with the removed hand. By way of example, the ergonomic region determination module 126 receives additional notifications from the grip pattern detection module 124 indicating when the user removes one hand from the mobile device 102 previously held with the two-handed ergonomically incorrect grip pattern 308. The additional notifications also include an indication of which edge of the mobile device 102 the hand is removed from. For example, the grip pattern detection module 124 determines that pressure is released from a left-hand side of the mobile device 102 (e.g., from the location 318), and issues a notification to the ergonomic region determination module 126 indicating that a left hand of the user is removed from the two-handed ergonomically incorrect grip pattern 308. In response to receiving the notification, the ergonomic region determination module 126 monitors for one or more subsequent touch events. If a subsequent touch event is received as input with the removed hand of the user 104 and within a threshold amount of time, the location of the touch event is identified and stored as a touched location that is out of reach for a thumb of the user 104 holding the mobile device 102 with the two-handed ergonomically incorrect grip pattern 308.

Over time, a plurality of touched locations that are out of reach for a thumb of the user 104 holding the mobile device 102 with the one-handed ergonomically incorrect grip pattern 304 are identified and stored in the first set. In addition, a plurality of touched locations that are out of reach for a thumb of the user 104 holding the mobile device 102 with two-handed ergonomically incorrect grip pattern 308 are identified and stored in the second set. Based on the touched locations, the ergonomic region determination module determines an ergonomic region 136 of the user interface 120 for when the mobile device 102 is in the portrait orientation and held with the one-handed ergonomically incorrect grip pattern 304, and an ergonomic region 136 of the user interface 120 for when the mobile device 102 is in the landscape orientation and held with the two-handed ergonomically incorrect grip pattern 308.

FIG. 4 depicts an example 400 showing ergonomic regions for different device orientations in one or more implementations. As shown at 402, the mobile device has the portrait orientation and a first set of touched locations 404 (e.g., illustrated as circles within the display device 110 of the mobile device 102) that are out of reach for a thumb of the user 104 holding the mobile device 102 with the one-handed ergonomically incorrect grip pattern 304. Based on the first set of touched locations 404, the ergonomic region determination module 126 defines a touch line 406 (e.g., illustrated by the solid line) above which at least a threshold percentage of the touched locations 404 are positioned. By way of example, the touch line 406 is defined such that at least 80% of the touched locations 404 are above the touch line 406. In at least one example, the ergonomic region determination module 126 is configured to identify at least one false touched location 408, which is a touched location identified by the ergonomic region determination module 126 that is at least a threshold distance below the touch line 406. When defining the touch line 406, the ergonomic region determination module 126 is configured to disregard the false touched location 408. Based on the touch line 406, the ergonomic region determination module 126 determines a first ergonomic region 410 (e.g., illustrated by the dotted line) for the portrait orientation of the mobile device 102. In the illustrated example, for instance, the ergonomic region determination module 126 defines the first ergonomic region 410 as a largest rectangle that fits within the user interface 120 above the touch line 406.

As shown at 412, the mobile device has the landscape orientation and a second set of touched locations 414 (e.g., illustrated as circles within the display device 110 of the mobile device 102) that are out of reach for a thumb of the user 104 holding the mobile device 102 with the two-handed ergonomically incorrect grip pattern 308. Based on the touched locations 414, the ergonomic region determination module 126 defines a touch line 416 (e.g., illustrated by the solid line) in the user interface 120 above which at least a threshold percentage of the touched locations 414 are positioned. By way of example, the touch line 416 is defined such that at least 80% of the touched locations 414 are above the touch line 416. In at least one example, the ergonomic region determination module 126 is configured to identify at least one false touched location 418, which is a touched location identified by the ergonomic region determination module 126 that is at least a threshold distance away from the touch line 416. When defining the touch line 416, the ergonomic region determination module 126 is configured to disregard the false touched location 418. Based on the touch line 416, the ergonomic region determination module 126 determines a second ergonomic region 420 for the landscape orientation of the mobile device 102. In the illustrated example, for instance, the ergonomic region determination module 126 defines the second ergonomic region 420 as a largest rectangle, the entirety of which can fit within the user interface 120 above the touch line 416.

By determining the ergonomic regions 410, 420 based on the touched locations 404, 414, the ergonomic region determination module 126 determines ergonomic regions that are specific to the user 104 of the mobile device 102 accounting for the user's particular hand and finger size. In at least one alternative implementation, the mobile device 102 includes (e.g., in memory) pre-stored ergonomic regions for the portrait orientation and the landscape orientation to be used by the ergonomic grip assistance system 112 instead of the custom ergonomic regions 410, 420. Additionally or alternatively, the ergonomic grip assistance system 112 uses the pre-stored ergonomic regions when there is an insufficient number of the touched locations 404, 414 to define the custom ergonomic regions 410, 420. Further, although depicted as rectangles positioned entirely above the touch line 406, 416, it is to be appreciated that the ergonomic regions 410, 420 can be any suitable shape, such as a circle, an ellipse, a polygon having any number of sides, an irregular shape, and so on. Further, it is to be appreciated that the ergonomic regions 410, 420 can be any suitable size, and as such the ergonomic regions 410, 420 can extend at least partially below the touch lines 406, 416 in variations.

Returning to FIG. 2, the interface interaction detection module 128 is employed to determine one or more user interaction types 204 utilized by the user 104 to control content displayed in the user interface 120 based on the sensor data 114. In one or more implementations, the user 104 controls the display of content in the user interface 120 via one or more selectable elements 122. By way of example, as illustrated in FIG. 1, the display device 110 displays a user interface 120 of a content streaming application having selectable elements 122 including a rewind button, a pause button, a fast forward button, and a scrub bar which are selectable to play, pause, and/or navigate to a desired portion of the streaming content. As an additional example, the display device 110 displays a user interface 120 of a messaging application or an e-mail application having selectable elements 122 including letters and/or numbers of an on-display keyboard that are selectable to provide text input. Additionally or alternatively, the user 104 controls the content in the user interface 120 by scrolling via one or more touch and swipe inputs to the touch-sensitive display device 110. For example, the display device 110 displays a user interface 120 of a social media application or a webpage in which new or different content of the user interface 120 is displayable in response to touch and swipe inputs being received via the display device 110.

To determine the one or more user interaction types 204, the interface interaction detection module 128 receives sensor data 114 in the form of touch data collected by the touch-sensitive display device 110. The touch data includes locations in the user interface 120 where touch events are received, types of touch events (e.g., tap inputs, touch and swipe inputs, touch and hold inputs, and so on), durations of touch events, whether a touch event is received at a location in the user interface corresponding to a selectable element 122, etc. In one or more implementations, the interface interaction detection module 128 determines that the user interaction type 204 corresponds to user selection of the selectable elements 122 based on the touch data indicating that the selectable elements 122, when touched, cause a change or update to the content displayed in the user interface 120. Additionally or alternatively, the interface interaction detection module 128 determines that the user interaction type 204 corresponds to scrolling based on the touch data indicating that new or different content is displayed in the user interface 120 in response to one or more touch and swipe inputs being received.

The ergonomically incorrect grip pattern 202, the ergonomic region 136 and the user interaction type 204 are received by the interface adjustment module 130. The interface adjustment module 130 is employed to output an interface adjustment 206 in response to receiving an indication that the user is holding the mobile device 102 with the ergonomically incorrect grip pattern 202. Generally, the interface adjustment 206 causes the user interface 120 to be updated or modified to facilitate the user 104 holding the mobile device 102 with an ergonomically correct device grip. Further, the interface adjustment 206 is different depending on the user interaction type 204. For example, if the user interaction type 204 corresponds to the user selection of the selectable elements 122, the interface adjustment 206 causes movement of the selectable elements 122 to the ergonomic region 136. Additionally or alternatively, if the user interaction type 204 corresponds to scrolling, then the interface adjustment 206 causes addition of one or more user interface elements to the ergonomic region 136 that are selectable to scroll the user interface 120, and disablement of scrolling of the user interface 120 via the touch and swipe inputs.

Figure 5:
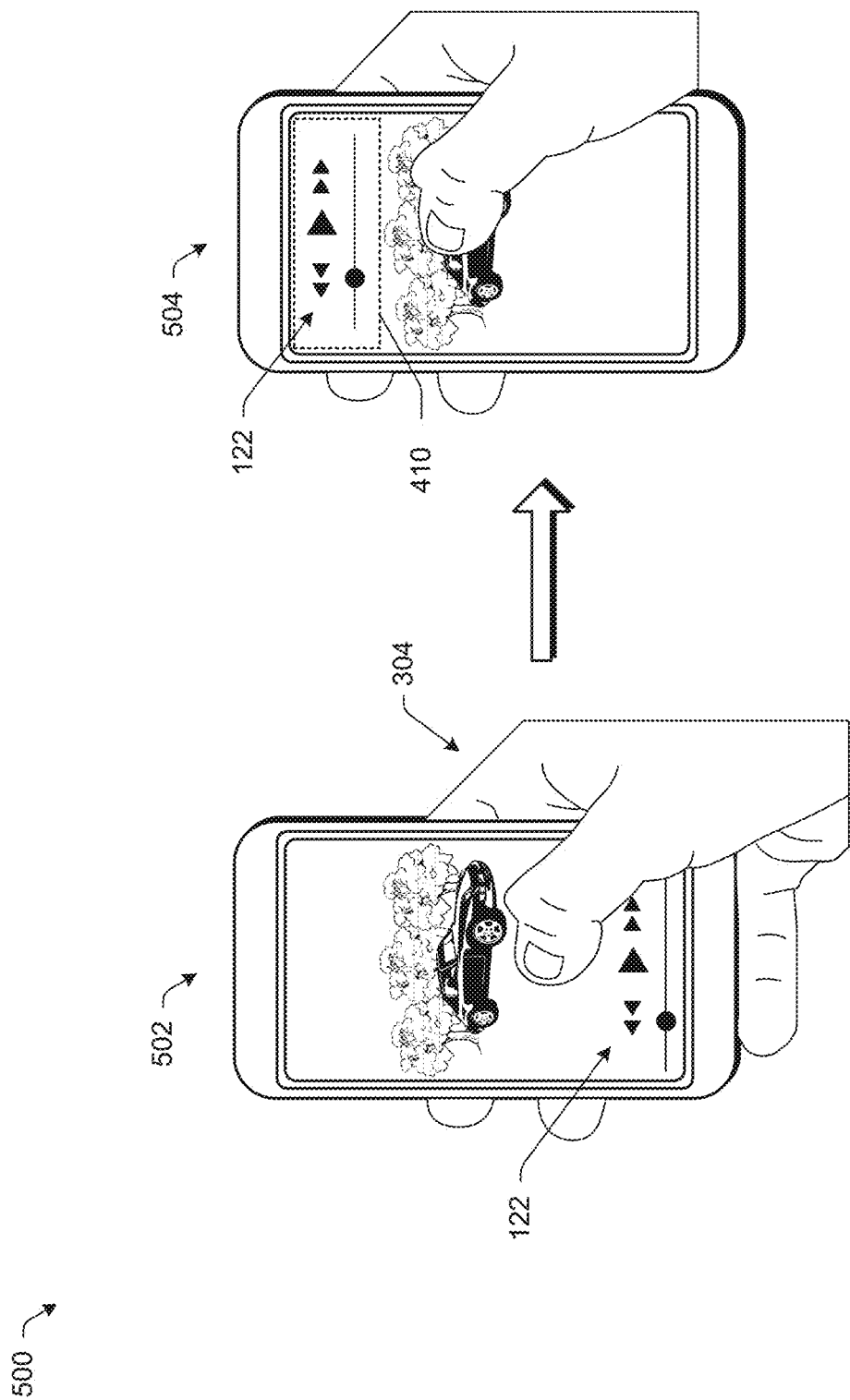
FIG. 5 depicts an example showing an interface adjustment to move selectable elements of a user interface to correct a one-handed ergonomically incorrect grip pattern.

FIG. 5 depicts an example 500 showing an interface adjustment to move selectable elements of a user interface to correct a one-handed ergonomically incorrect grip pattern. As shown at 502, the mobile device 102 has the portrait orientation, and the user 104 is holding the mobile device 102 with the one-handed ergonomically incorrect grip pattern 304. Further, the display device 110 is displaying a content-streaming user interface that includes selectable elements 122 for playing, pausing, and navigating to a desired portion of streaming content. Therefore, the user interaction type 204 in this example is detected as the content of the user interface 120 being controlled via user selection of the selectable elements 122. As shown at 502, the selectable elements are displayed in a region of the user interface 120 that is reachable by a thumb of the user 104 while the mobile device 102 is held with the one-handed ergonomically incorrect grip pattern 304.

Based on the user interface 120 being controlled via the selectable elements 122 and in response to receiving an indication that the mobile device 102 is held with the one-handed ergonomically incorrect grip pattern 304, the interface adjustment module 130 outputs an interface adjustment 206 to move the selectable elements to the first ergonomic region 410, as shown at 504. Notably, the interface adjustment 206 moves the selectable elements 122 to a different location in the user interface 120 without moving or otherwise modifying other content displayed in the user interface 120. Since the first ergonomic region 410 is out of reach for the thumb of the user 104 when the mobile device 102 is held with the one-handed ergonomically incorrect grip pattern 304, the interface adjustment 206 causes the user 104 to hold the mobile device 102 with an ergonomically correct grip pattern in order to reach the selectable elements 122 and interact with the user interface 120. As shown at 504, for instance, the interface adjustment 206 causes the user 104 to shift his or her device grip in an upward direction and tuck the pinky finger behind the mobile device 102, so that the weight of the mobile device 102 is no longer supported by the pinky finger.

Figure 6:
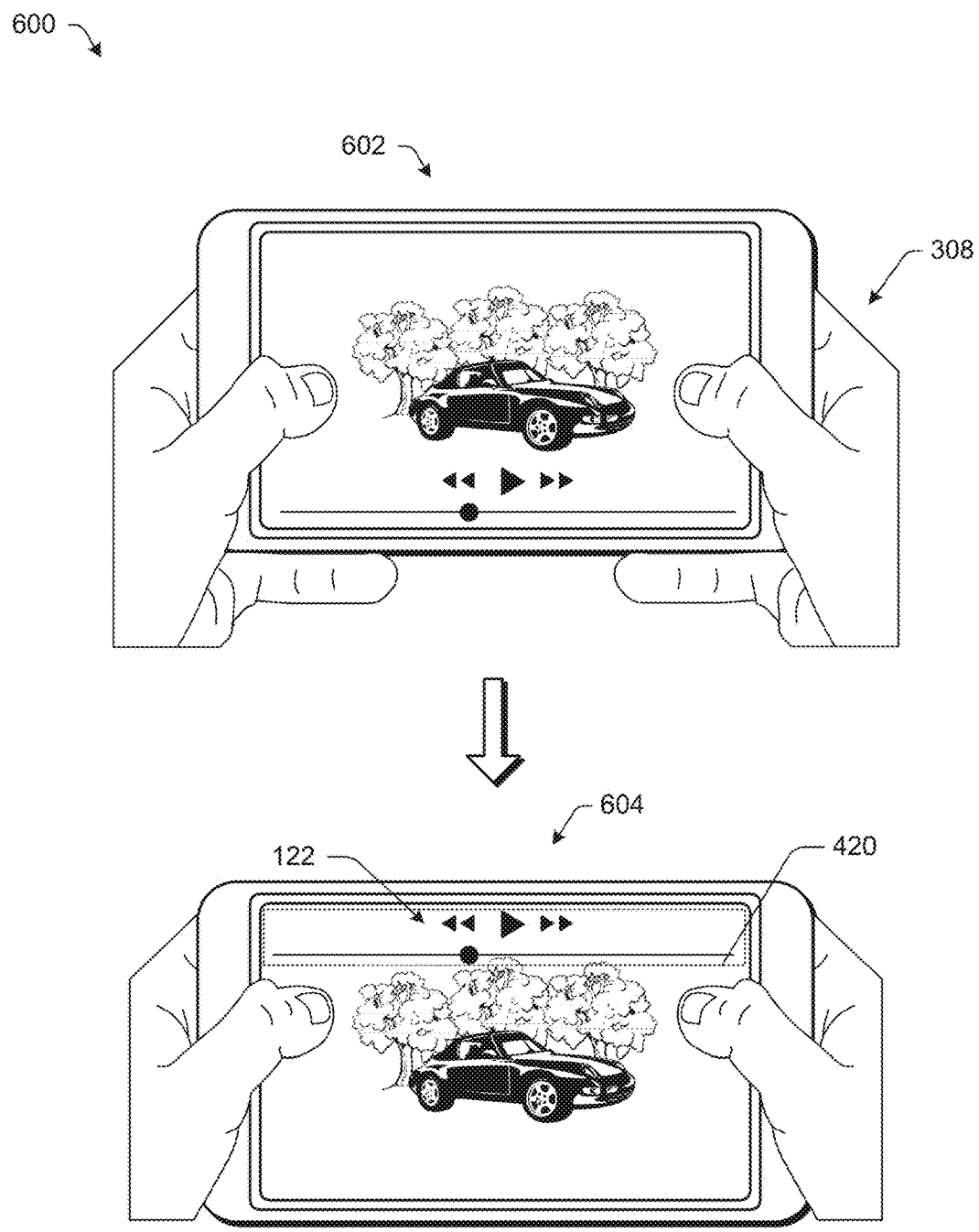
FIG. 6 depicts an example showing an interface adjustment to move selectable elements of a user interface to correct a two-handed ergonomically incorrect grip pattern.

FIG. 6 depicts an example 600 showing an interface adjustment to move selectable elements of a user interface to correct a two-handed ergonomically incorrect grip pattern. As shown at 602, the mobile device 102 has the landscape orientation, and the user 104 is holding the mobile device 102 with the two-handed ergonomically incorrect grip pattern 308. Further, the display device 110 is displaying a content streaming user interface that includes selectable elements 122 for playing, pausing, and navigating to a desired portion of streaming content. Therefore, the user interaction type 204 in this example is detected as the content of the user interface 120 being controlled via user selection of the selectable elements 122. As shown at 602, the selectable elements 122 are displayed in a region of the user interface 120 that is reachable by the thumbs of the user 104 while the mobile device 102 is held with the two-handed ergonomically incorrect grip pattern 308.

Based on the user interface 120 being controlled via the selectable elements 122 and in response to receiving an indication that the mobile device 102 is held with the two-handed ergonomically incorrect grip pattern 308, the interface adjustment module 130 outputs an interface adjustment 206 to move the selectable elements 122 to the second ergonomic region 420, as shown at 604. Notably, the interface adjustment 206 moves the selectable elements 122 to a different location in the user interface 120, without moving or otherwise modifying other content displayed in the user interface 120. Since the second ergonomic region 420 is out of reach for the thumbs of the user 104 when the mobile device 102 is held with the two-handed ergonomically incorrect grip pattern 308, the interface adjustment 206 causes the user 104 to hold the mobile device 102 with an ergonomically correct grip pattern in order to reach the selectable elements 122 and interact with the user interface 120. As shown at 604, for instance, the interface adjustment 206 causes the user 104 to shift his or her device grip in an upward direction and tuck the pinky fingers behind the mobile device 102, so that the weight of the mobile device 102 is no longer supported by the pinky fingers.

Figure 7:
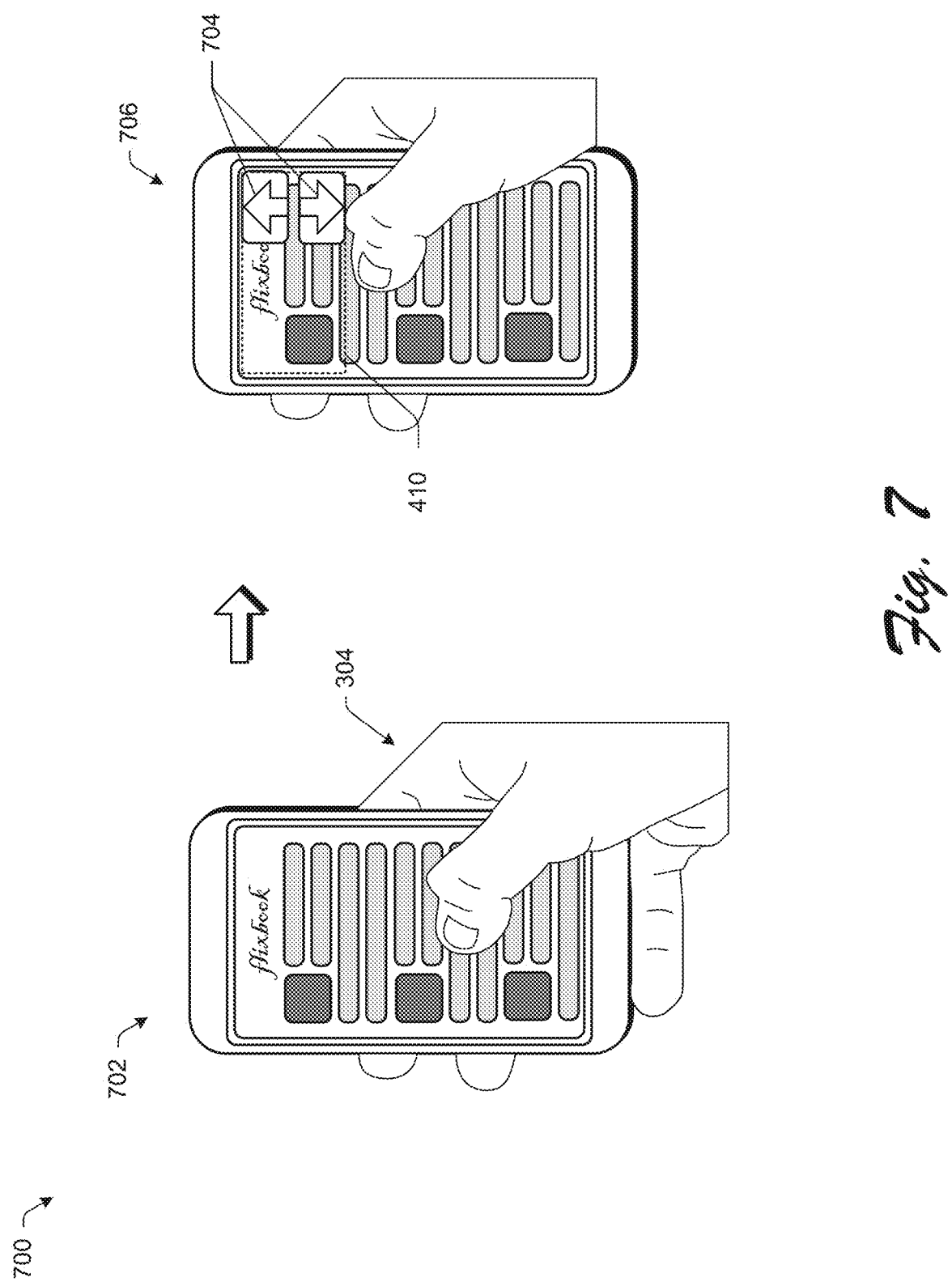
FIG. 7 depicts an example showing an interface adjustment to add user interface elements to a user interface to correct a one-handed ergonomically incorrect grip pattern.

FIG. 7 depicts an example 700 showing an interface adjustment to add user interface elements to a user interface to correct a one-handed ergonomically incorrect grip pattern. As shown at 702, the mobile device 102 has the portrait orientation, and the user 104 is holding the mobile device 102 with the one-handed ergonomically incorrect grip pattern 304. Further, the display device 110 is displaying a user interface 120 of a social media application, in which additional and/or different content is displayable in response to the user 104 providing touch and swipe inputs to the touch-sensitive display device 110. Therefore, the user interaction type 204 in this example is detected as the content of the user interface 120 being controlled by scrolling via touch and swipe inputs.

Based on the user interface 120 being controlled by scrolling via the touch and swipe inputs and in response to receiving an indication that the mobile device 102 is held with the one-handed ergonomically incorrect grip pattern 304, the interface adjustment module 130 outputs an interface adjustment 206 to add user interface elements 704 to the first ergonomic region 410, as shown at 706. In the illustrated example, the user interface elements 704 include a first user interface element that is selectable to scroll in an upward direction, e.g., to move the content of the user interface 120 in an upward direction and, as a result, display new or additional content at the bottom of the user interface 120. Further, the user interface elements 704 include a second user interface element that is selectable to scroll in a downward direction, e.g., to move the content of the user interface 120 in a downward direction, and as a result, display new or additional content at the top of the user interface 120. In addition, the interface adjustment 206 disables scrolling of the user interface 120 via touch and swipe inputs, e.g., so that scrolling of the user interface 120 is enabled solely via user selection of the user interface elements 704. Notably, the interface adjustment 206 adds the user interface elements 704 to the first ergonomic region 410 without moving or otherwise modifying other content displayed in the user interface 120.

Since the first ergonomic region 410 is out of reach for the thumb of the user 104 when the mobile device 102 is held with the one-handed ergonomically incorrect grip pattern 304, the interface adjustment 206 causes the user 104 to hold the mobile device 102 with an ergonomically correct grip pattern in order to reach the user interface elements 704 and scroll the user interface 120. As shown at 706, for instance, the user interface adjustment causes the user 104 to shift his or her device grip in an upward direction and tuck the pinky finger behind the mobile device 102, so that the weight of the mobile device 102 is no longer supported by the pinky finger.

Figure 8:
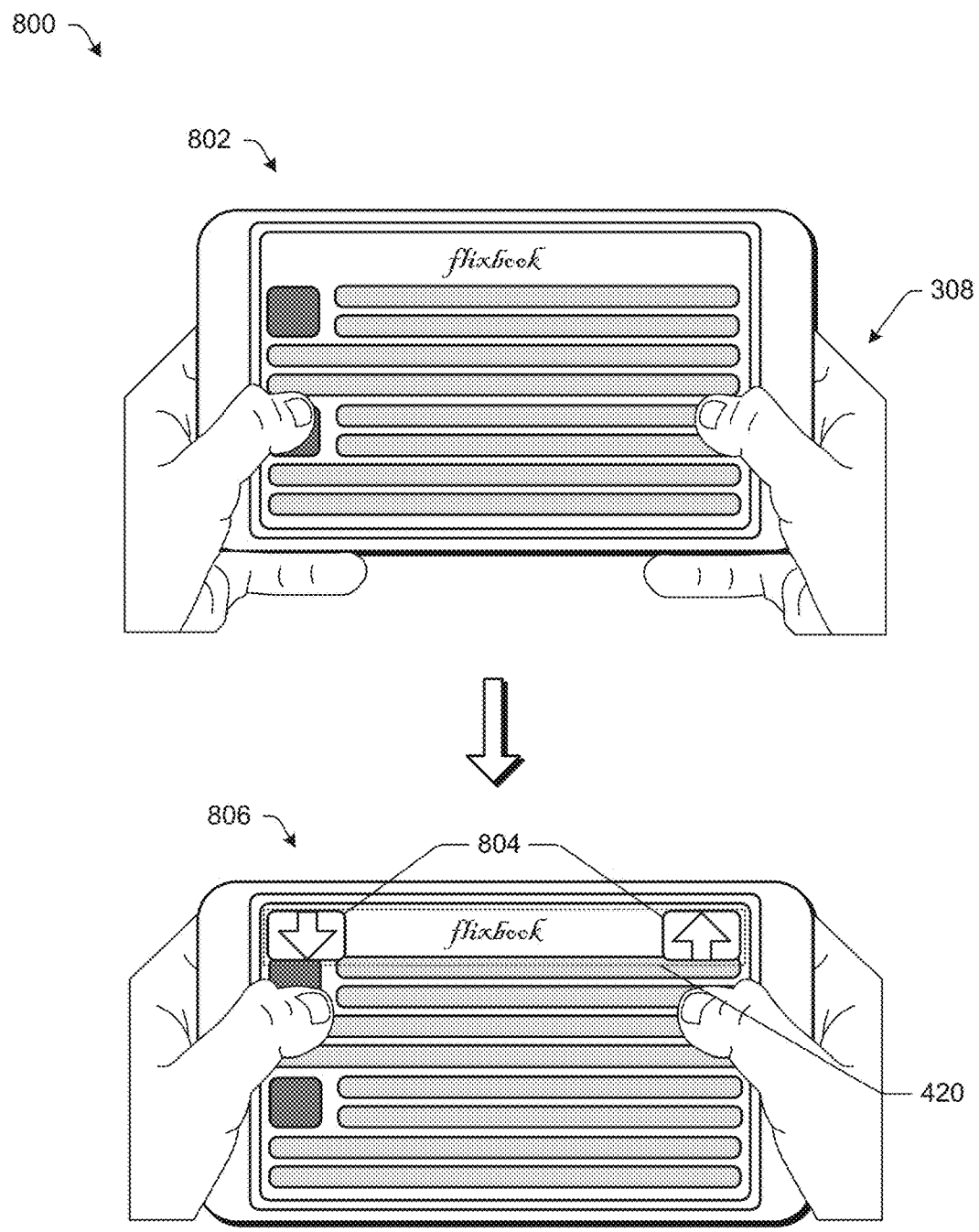
FIG. 8 depicts an example showing an interface adjustment to add user interface elements to a user interface to correct a two-handed ergonomically incorrect grip pattern.

FIG. 8 depicts an example 800 showing an interface adjustment to add user interface elements to a user interface to correct a two-handed ergonomically incorrect grip pattern. As shown at 802, the mobile device 102 has the landscape orientation, and the user 104 is holding the mobile device 102 with the two-handed ergonomically incorrect grip pattern 308. Further, the display device 110 is displaying a user interface of a social media application in which additional and/or different content is displayable in response to the user 104 providing touch and swipe inputs to the touch-sensitive display device 110. Therefore, the user interaction type 204 in this example is detected as the content of the user interface 120 being controlled by scrolling via touch and swipe inputs.

Based on the user interface 120 being controlled by scrolling via the touch and swipe inputs and in response to receiving an indication that the mobile device 102 is held with the two-handed ergonomically incorrect grip pattern 308, the interface adjustment module 130 outputs an interface adjustment 206 to add user interface elements 804 to the second ergonomic region 420, as shown at 806. In the illustrated example, the user interface elements 804 include a first user interface element that is selectable to scroll in an upward direction, e.g., to move the content of the user interface 120 in an upward direction, and as a result, display new or additional content at the bottom of the user interface 120. Further, the user interface elements 804 include a second user interface element that is selectable to scroll in a downward direction, e.g., to move the content of the user interface 120 in a downward direction, and as a result, display new or additional content at the top of the user interface 120. In addition, the interface adjustment 206 disables scrolling of the user interface 120 via touch and swipe inputs, e.g., so that scrolling of the user interface 120 is enabled solely via user selection of the user interface elements 804. Notably, the interface adjustment 206 adds the user interface elements 804 to the second ergonomic region 420 without moving or otherwise modifying other content displayed in the user interface 120.

Since the second ergonomic region 420 is out of reach for the thumbs of the user 104 when the mobile device 102 is held with the two-handed ergonomically incorrect grip pattern 308, the interface adjustment 206 causes the user 104 to hold the mobile device 102 with an ergonomically correct grip pattern in order to reach the user interface elements 804 and scroll the user interface 120. As shown at 806, for instance, the interface adjustment 206 causes the user 104 to shift his device grip in an upward direction and tuck the pinky fingers behind the mobile device 102, so that the weight of the mobile device 102 is no longer supported by the pinky fingers. Therefore, the various user interface adjustments shown and described with respect to FIGS. 5-8 facilitate the user 104 holding the mobile device 102 with an ergonomic device grip, thereby reducing the risk of exacerbating an underlying medical condition and/or injury associated with the user's hand. As previously mentioned, the ergonomically correct grip patterns, as depicted at 504, 604, 706, and 806, may additionally be referred to as comfortable grip patterns, e.g., for users that prefer to use the ergonomically correct grip patterns for reasons of comfort.

In one or more implementations, the interface adjustment module 130 is configured to output the interface adjustment 206 based on the user 104 holding the mobile device with the ergonomically incorrect grip pattern for at least a threshold amount of time. As previously discussed, the interface adjustment module 130 receives from the grip pattern detection module 124 start notifications indicating when the user 104 begins holding the mobile device 102 with the ergonomically incorrect grip pattern 202 and stop notifications indicating when the user stops holding the mobile device with the ergonomically incorrect grip pattern 202. Responsive to determining that the user 104 has been holding the mobile device with the ergonomically incorrect grip pattern 202 for at least the threshold amount of time (e.g., thirty seconds), the interface adjustment module 130 outputs the interface adjustment 206 to adjust the user interface 120. In contrast, the interface adjustment module 130 does not output the interface adjustment 206 if the user 104 has been holding the mobile device 102 with the ergonomically incorrect grip pattern 202 for less than the threshold amount of time.

Figure 9:
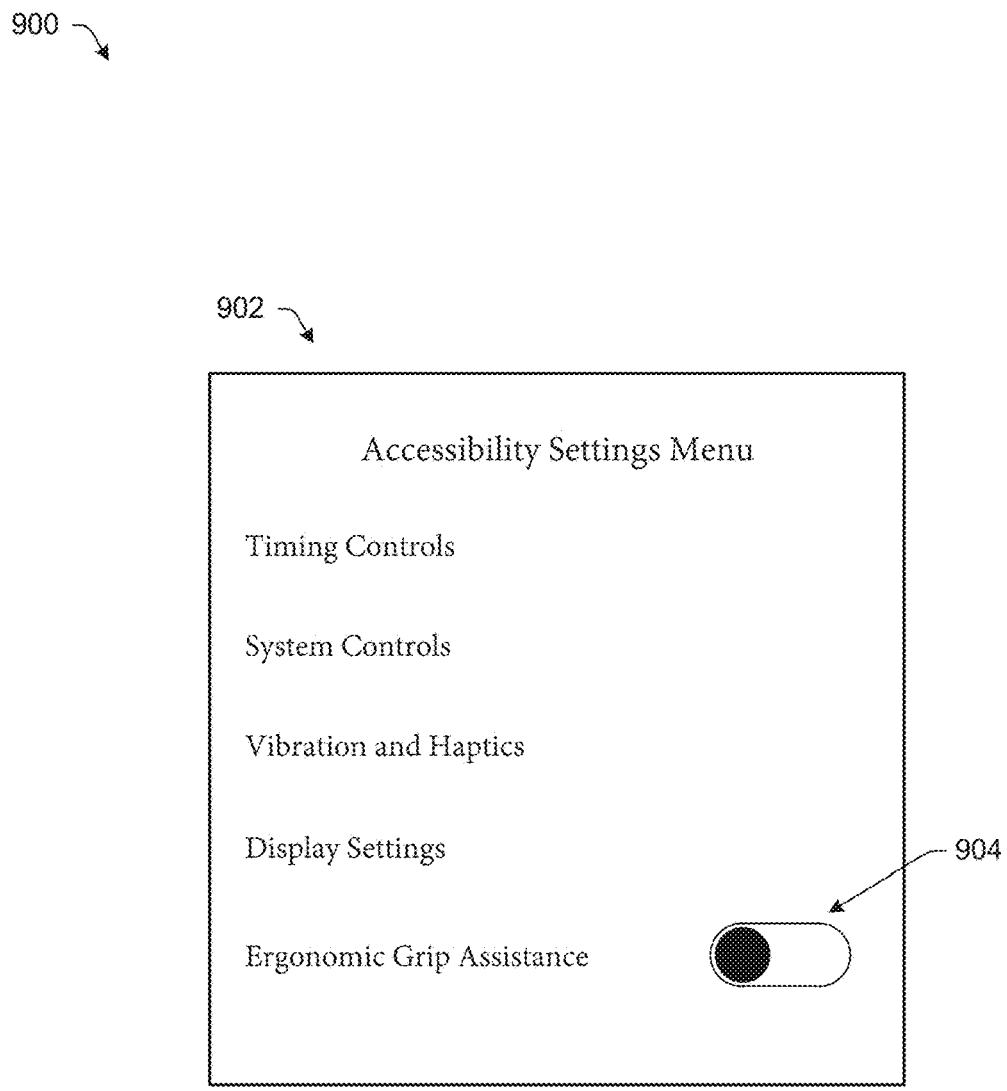
FIG. 9 is an example showing an accessibility settings menu from which ergonomic grip assistance can be enabled.

FIG. 9 is an example 900 showing an accessibility settings menu from which ergonomic grip assistance can be enabled. In one or more implementations, the interface adjustment module 130 is configured to output the interface adjustment 206 in response to receiving user input enabling ergonomic grip assistance. As shown in the example 900, the user 104 may navigate to an accessibility settings menu 902 of the mobile device 102 having a user-selectable option 904 to enable ergonomic grip assistance. In this example, the interface adjustment module 130 is configured to output the interface adjustment 206 solely if user input is received to enable the ergonomic grip assistance, e.g., via the user-selectable option 904 of the accessibility settings menu 902. In contrast, the interface adjustment module 130 does not output the interface adjustment 206 if ergonomic grip assistance has not yet been enabled, even if the user 104 is detected as holding the mobile device 102 with the ergonomically incorrect grip pattern 202.

Figure 10:
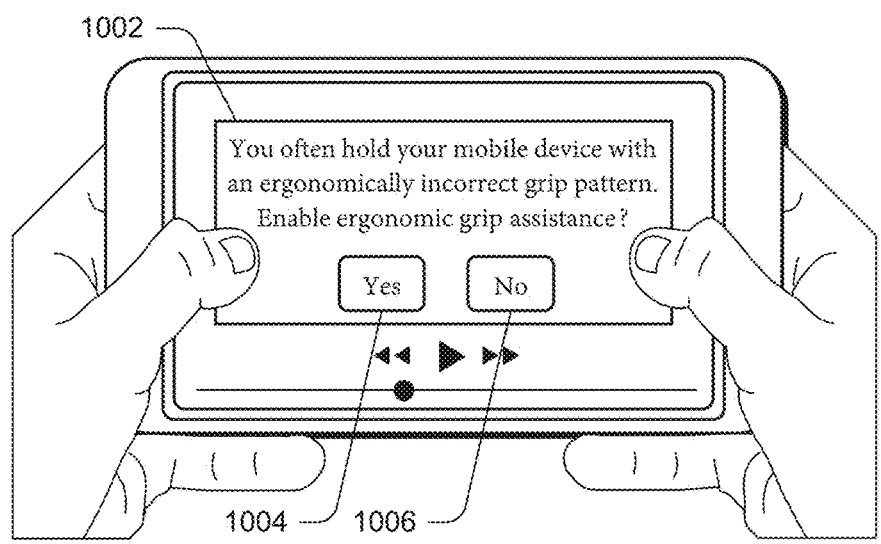
FIG. 10 is an example showing a user interface prompt from which ergonomic grip assistance can be enabled.

FIG. 10 is an example 1000 showing a user interface prompt from which ergonomic grip assistance can be enabled. In one or more implementations, the ergonomic grip assistance system 112 displays a prompt 1002 in the user interface 120 to enable ergonomic grip assistance in response to a determination that the user 104 holds the mobile device 102 with the ergonomically incorrect grip pattern for at least a threshold percentage of time that the mobile device is actively being used. In one example, the ergonomic grip assistance system 112 can detect an active device usage session, and track an amount of time that the device is held with the ergonomically incorrect grip pattern 202. Over one or more active device usage sessions, the ergonomic grip assistance can track the user's device grip for a threshold number of active device usage hours. If the ergonomic grip assistance system determines that the user 104 holds the mobile device 102 with the ergonomically incorrect grip pattern 202 for at least a threshold percentage of the threshold number of active device usage hours, then the ergonomic grip assistance system 112 displays the prompt 1002 in the user interface 120. As shown, the prompt 1002 includes a first user interface element 1004 that is selectable to enable ergonomic grip assistance and a second user interface element 1006 that is selectable to decline ergonomic grip assistance.

Figure 11:
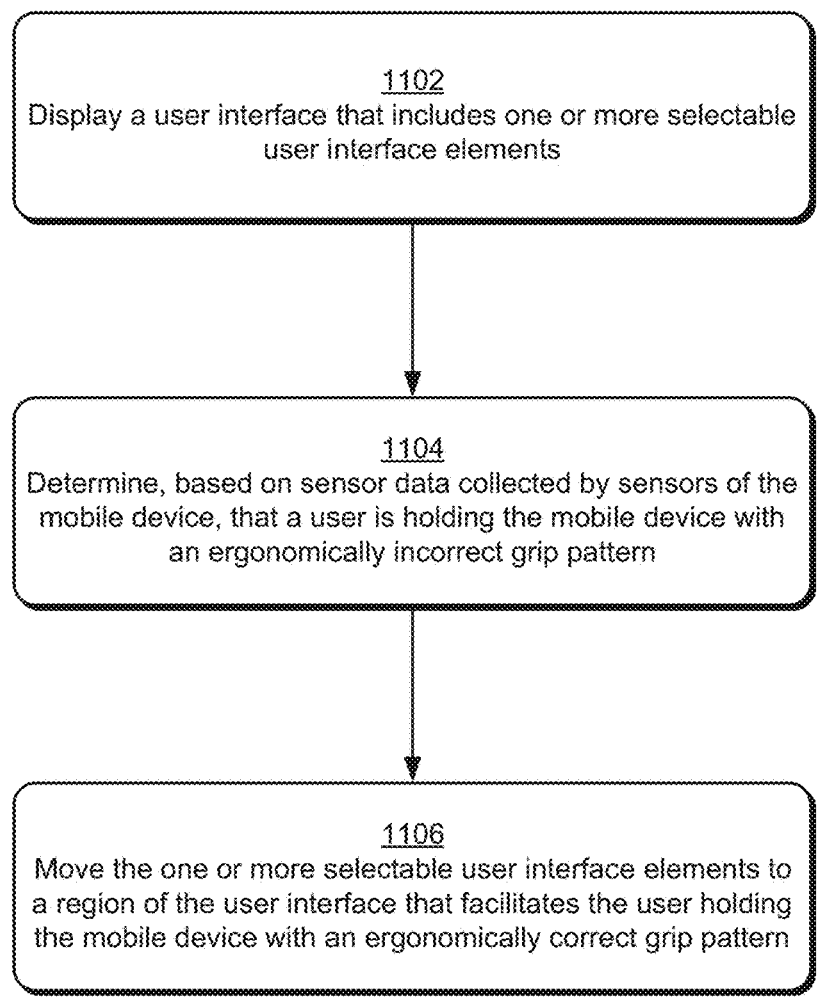
FIG. 11 depicts an example procedure of user interface adjustments for ergonomic device grip to move selectable elements of a user interface to facilitate an ergonomically correct grip pattern.

FIG. 11 depicts an example procedure 1100 of user interface adjustments for ergonomic device grip to move selectable elements of a user interface to facilitate an ergonomically correct user grip pattern. The order in which the method is described is not intended to be construed as a limitation, and any number or combination of the described method operations can be performed in any order to perform a method, or an alternate method.

A user interface is displayed that includes one or more selectable user interface elements (block 1102). By way of example, the display device 110 displays the user interface 120 that includes the selectable elements 122 that are selectable to control display of content in the user interface 120.

A user is determined as holding the mobile device with an ergonomically incorrect grip pattern based on sensor data collected by sensors of the mobile device (block 1104). By way of example, the grip pattern detection module 124 receives sensor data 114 in the form of pressure data and key press data, indicating locations along the edges of the mobile device 102 where pressure is applied to the mobile device 102, as well as a degree of pressure applied at the locations. If the pressure data indicates that the weight of the mobile device 102 is at least partially supported by at least one finger of the user 104, then the grip pattern detection module 124 detects the ergonomically incorrect grip pattern 202.

The one or more selectable user interface elements are moved to a region of the user interface that facilitates the user holding the mobile device with an ergonomically correct grip pattern (block 1106). By way of example, the interface adjustment module 130 receives an indication of the ergonomically incorrect grip pattern 202 and the user interaction type 204. In this example, the interface interaction detection module 128 detects the user interaction type 204 as the content of the user interface 120 being controlled via a user selection of the selectable elements 122. Based on the content of the user interface 120 being controlled via user selection of the selectable elements 122 and in response to receiving the ergonomically incorrect grip pattern 202, the interface adjustment module 130 outputs an interface adjustment 206 to move the selectable elements 122 to the ergonomic region 136 of the user interface 120.

Figure 12:
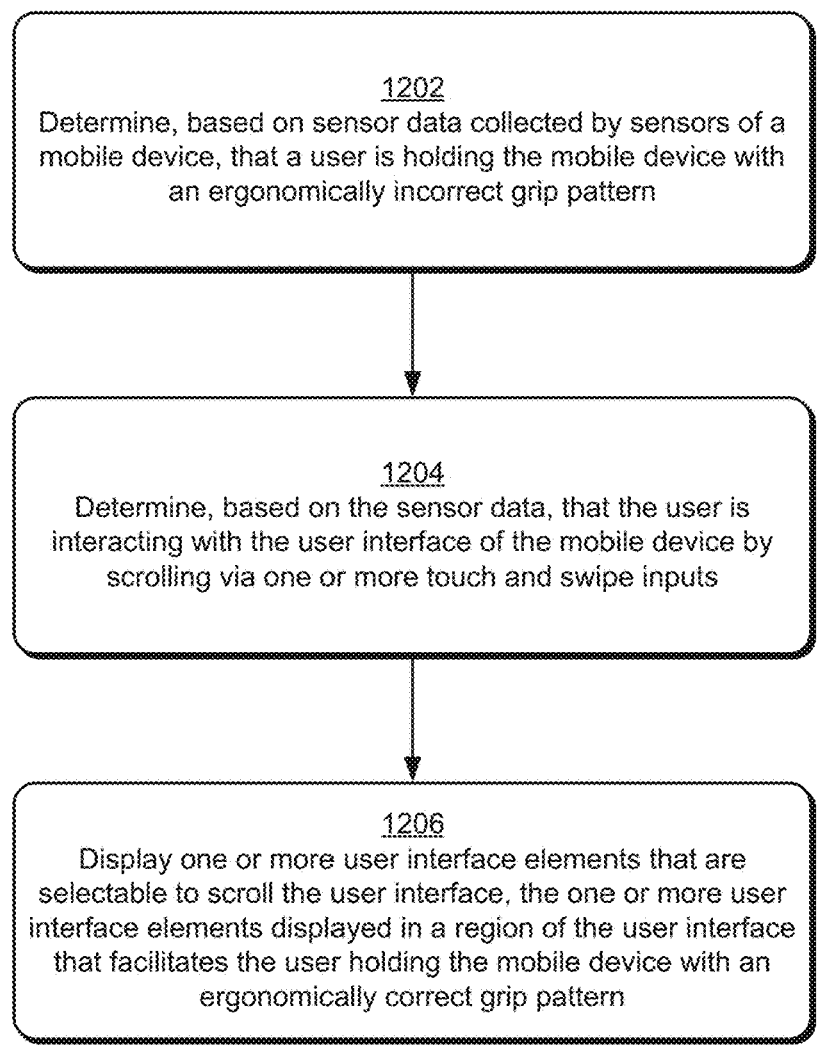
FIG. 12 depicts an example procedure of user interface adjustments for ergonomic device grip to include a selectable element for user interface scrolling to facilitate an ergonomically correct user grip pattern.

FIG. 12 depicts an example procedure 1200 of user interface adjustments for ergonomic device grip to move selectable elements of a user interface to facilitate an ergonomically correct user grip pattern. The order in which the method is described is not intended to be construed as a limitation, and any number or combination of the described method operations can be performed in any order to perform a method, or an alternate method.

A user is determined as holding the mobile device with an ergonomically incorrect grip pattern based on sensor data collected by sensors of a mobile device (block 1202). By way of example, the grip pattern detection module 124 receives sensor data 114 in the form of pressure data and key press data, indicating locations along the edges of the mobile device 102 where pressure is applied to the mobile device 102, as well as a degree of pressure applied at the locations. If the pressure data indicates that the weight of the mobile device 102 is at least partially supported by at least one finger of the user 104, then the grip pattern detection module 124 detects the ergonomically incorrect grip pattern 202.

The user is determined as interacting with the user interface of the mobile device by scrolling via one or more touch and swipe inputs based on the sensor data (block 1204). By way of example, the interface interaction detection module 128 receives touch data indicating that the content of the user interface 120 is being controlled by scrolling via touch and swipe inputs. As a specific example, the display device 110 displays a user interface 120 of a social media application in which different or additional content is displayable by scrolling via touch and swipe inputs to the touch-sensitive display device 110.

Figure 13:
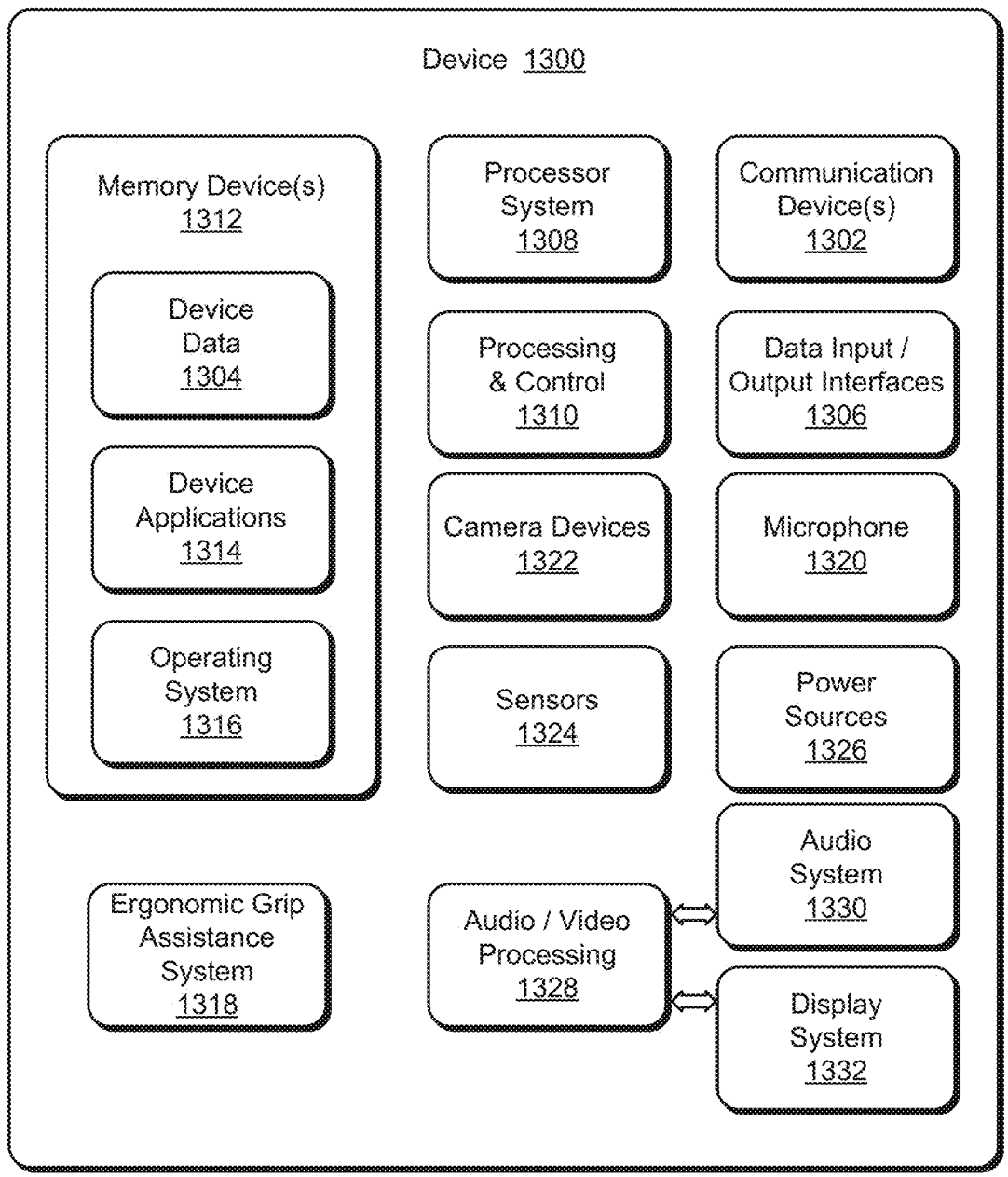
FIG. 13 illustrates various components of an example device that can implement aspects of user interface adjustments for ergonomic device grip.

One or more user interface elements that are selectable to scroll the user interface are displayed in a region of the user interface that facilitates the user holding the mobile device with an ergonomically correct grip pattern (block 1206). By way of example, the interface adjustment module 130 receives an indication of the ergonomically incorrect grip pattern 202 and the user interaction type 204. Based on the content of the user interface 120 being controlled by scrolling via touch and swipe inputs and responsive to receiving the ergonomically incorrect grip pattern 202, the interface adjustment module 130 outputs an interface adjustment 206 to add user interface elements (e.g., the user interface elements 704, 804) to the ergonomic region 136 that are selectable to scroll the user interface 120. In one or more implementations, the interface adjustment 206 also disables scrolling of the user interface 120 via the touch and swipe inputs, e.g., so that scrolling of the user interface 120 is enabled solely via user selection of the added user interface elements FIG. 13 illustrates various components of an example device 1300, which can implement aspects of the techniques and features for user interface adjustments for ergonomic device grip, as described herein. The example device 1300 can be implemented as any of the devices described with reference to the previous FIGS. 1-12, such as any type of a wireless device, mobile device, mobile phone, flip phone, client device, companion device, paired device, display device, tablet, computing, communication, entertainment, gaming, media playback, and/or any other type of computing and/or electronic device. For example, mobile device 102 described with reference to FIGS. 1-12 may be implemented as the example device 1300.

The example device 1300 can include various, different communication devices 1302 that enable wired and/or wireless communication of device data 1304 with other devices. The device data 1304 can include any of the various devices' data and content that is generated, processed, determined, received, stored, and/or communicated from one computing device to another. Generally, the device data 1304 can include any form of audio, video, image, graphics, and/or electronic data that is generated by applications executing on a device. The communication devices 1302 can also include transceivers for cellular phone communication and/or for any type of network data communication.

The example device 1300 can also include various, different types of data input/output (I/O) interfaces 1306, such as data network interfaces that provide connection and/or communication links between the devices, data networks, and other devices. The I/O interfaces 1306 can be used to couple the device to any type of components, peripherals, and/or accessory devices, such as a computer input device that may be integrated with the example device 1300. The I/O interfaces 1306 may also include data input ports via which any type of data, information, media content, communications, messages, and/or inputs can be received, such as user inputs to the device, as well as any type of audio, video, image, graphics, and/or electronic data received from any content and/or data source.

The example device 1300 includes a processor system 1308 of one or more processors (e.g., any of microprocessors, controllers, and the like) and/or a processor and memory system implemented as a system-on-chip (SoC) that processes computer-executable instructions. The processor system 1308 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 1310. The example device 1300 may also include any type of a system bus or other data and command transfer system that couples the various components within the device. A system bus can include any one or combination of different bus structures and architectures, as well as control and data lines.

The example device 1300 also includes memory and/or memory devices 1312 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 1312 include volatile memory and non-volatile memory, fixed and removable media devices, and any suitable memory device or electronic data storage that maintains data for computing device access. The memory devices 1312 can include various implementations of random-access memory (RAM), read-only memory (ROM), flash memory, and other types of storage media in various memory device configurations. The example device 1300 may also include a mass storage media device.

The memory devices 1312 (e.g., as computer-readable storage memory) provide data storage mechanisms, such as to store the device data 1304, other types of information and/or electronic data, and various device applications 1314 (e.g., software applications and/or modules). For example, an operating system 1316 can be maintained as software instructions with a memory device 1312 and executed by the processor system 1308 as a software application. The device applications 1314 may also include a device manager, such as any form of a control application, software application, signal-processing and control module, code that is specific to a particular device, a hardware abstraction layer for a particular device, and so on.

In this example, the device 1300 includes an ergonomic grip assistance system 1318 that implement various aspects of the described features and techniques for user interface adjustments for ergonomic device grip. The ergonomic grip assistance system 1318 can be implemented with hardware components and/or in software as one of the device applications 1314, such as when the example device 1300 is implemented as the mobile device 102 as described with reference to FIGS. 1-12. An example of the ergonomic grip assistance system 1318 includes the ergonomic grip assistance system 112 as implemented by the mobile device 102, such as software application(s) and/or as hardware components of the mobile device 102. In implementations, the ergonomic grip assistance system 1318 may include independent processing, memory, and logic components as a computing and/or electronic device integrated with the example device 1300.

The example device 1300 can also include a microphone 1320 and/or camera devices 1322, as well as sensors 1324. The sensors 1324 can include motion sensors, e.g., implemented as components of an inertial measurement unit (IMU). Further, the motion sensors can be implemented with various sensors, such as a gyroscope, an accelerometer, and/or other types of motion sensors to sense motion of the device 1300. The motion sensors can generate sensor data vectors having three-dimensional parameters (e.g., rotational vectors in x, y, and z-axis coordinates) indicating location, position, acceleration, rotational speed, and/or orientation of the device. The sensors 1324 can also include pressure sensors, such as to measure where on the device 1300 pressure is applied and an associated degree of pressure. The sensors 1324 can also include touch sensors (e.g., capacitive and/or resistive touch sensors), such as to detect touch input to the example device 1300. The example device 1300 can also include one or more power sources 1326, such as when the device is implemented as a wireless device and/or mobile device. The power sources 1326 may include a charging and/or power system, and can be implemented as a flexible strip battery, a rechargeable battery, a charged super-capacitor, and/or any other type of active or passive power source.

The example device 1300 can also include an audio and/or video processing system 1328 that generates audio data for an audio system 1330 and/or generates display data for a display system 1332. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1300. Alternatively, the audio system and/or the display system are external, peripheral components to the example device.

As used herein, including in the claims, "or" as used in a list of items (e.g., a list of items prefaced by a phrase such as "at least one of" or "one or more of" or "based at least in part on") indicates an inclusive list such that, a list of at least one of A, B, or C means A or B or C or AB or AC or BC or ABC (i.e., A and B and C). Further, as used herein, the phrase "based on" shall not be construed as a reference to a closed set of conditions. For example, an operation or determination described as "based on condition A" may be based on both a condition A and a condition B without departing from the scope of the present disclosure, and the phrase "based on" shall be construed in the same manner as the phrase "based at least in part on."

Although implementations for user interface adjustments for ergonomic device grip have been described in language specific to features and/or methods, the appended claims are not necessarily limited to the specific features or methods described. Rather, the specific features and methods are disclosed as example implementations for user interface adjustments for ergonomic device grip, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a method, comprising displaying, by a mobile device, a user interface that includes one or more selectable user interface elements; determining, based on sensor data collected by sensors of the mobile device, that a user is holding the mobile device with an ergonomically incorrect grip pattern; and moving, in response to determining that the user is holding the mobile device with the ergonomically incorrect grip pattern, the one or more selectable user interface elements to a region of the user interface that facilitates the user holding the mobile device with an ergonomically correct grip pattern.

In some aspects, the techniques described herein relate to a method, further comprising determining, based on the sensor data, that the user has held the mobile device with the ergonomically incorrect grip pattern for at least a threshold amount of time, and wherein the one or more selectable user interface elements are moved in response to determining that the user has held the mobile device with the ergonomically incorrect grip pattern for at least the threshold amount of time.

In some aspects, the techniques described herein relate to a method, further comprising receiving user input, via an accessibility settings menu of the mobile device, enabling ergonomic grip assistance, and wherein moving the one or more selectable user interface elements is based on the user input.

In some aspects, the techniques described herein relate to a method, wherein the sensor data includes at least one of: touch data indicating locations in the user interface where touch events are received; pressure data indicating a pressure applied to the mobile device at different portions of the ergonomically incorrect grip pattern; or key press data indicating a pressure applied to one or more keys of the mobile device.

In some aspects, the techniques described herein relate to a method, wherein determining that the user is holding the mobile device with the ergonomically incorrect grip pattern includes determining, based on the sensor data, that a weight of the mobile device is at least partially supported by a finger of the user.

In some aspects, the techniques described herein relate to a method, wherein the region of the user interface is out of reach for a thumb of the user while the weight of the mobile device is at least partially supported by the finger of the user.

In some aspects, the techniques described herein relate to a method, further comprising determining, based on the sensor data, whether the mobile device is oriented with a portrait orientation or a landscape orientation, the region of the user interface being a first portion of the user interface based on the mobile device being oriented with the portrait orientation, and the region of the user interface being a second portion of the user interface based on the mobile device being oriented with the landscape orientation.

In some aspects, the techniques described herein relate to a method, further comprising receiving sensor data that includes touched locations on a display screen of the mobile device which caused the user to no longer hold the mobile device with the ergonomically incorrect grip pattern; and determining the region of the user interface based on the touched locations.

In some aspects, the techniques described herein relate to a method, further comprising: receiving sensor data that includes touched locations on a display screen of the mobile device which caused the user to touch the touched locations with a hand that is not holding the mobile device with the ergonomically incorrect grip pattern; and determining the region of the user interface based on the touched locations.

In some aspects, the techniques described herein relate to a method, further comprising receiving sensor data that includes touched locations on a display screen of the mobile device which caused the user to remove a hand from the mobile device held with the ergonomically incorrect grip pattern and use the removed hand to touch the touched locations; and determining the region of the user interface based on the touched locations.

In some aspects, the techniques described herein relate to a method, wherein moving the one or more selectable user interface elements to the region of the user interface includes moving the one or more selectable user interface elements without modifying additional portions of the user interface.

In some aspects, the techniques described herein relate to a method, further comprising determining, based on the sensor data, that the user is interacting with the user interface of the mobile device by scrolling via one or more touch and swipe inputs; and displaying, responsive to determining that the user is holding the mobile device with the ergonomically incorrect grip pattern, one or more additional user interface elements that are selectable to enable scrolling of the user interface, the one or more additional user interface elements displayed in the region of the user interface.

In some aspects, the techniques described herein relate to a method, further comprising disabling, responsive to determining that the user is holding the mobile device with the ergonomically incorrect grip pattern, scrolling of the user interface via touch and swipe inputs.

In some aspects, the techniques described herein relate to a mobile device, comprising a display device to display a user interface; and a non-transitory computer-readable medium storing instructions, which when executed by a processing device, cause the processing device to perform operations including determining, based on sensor data collected by sensors of the mobile device, that a user is holding the mobile device with an uncomfortable grip pattern; determining, based on the sensor data, that the user is interacting with the user interface of the mobile device by scrolling via one or more touch and swipe inputs; and displaying, responsive to determining that the user is holding the mobile device with the uncomfortable grip pattern, one or more user interface elements that are selectable to scroll the user interface, the one or more user interface elements displayed in a region of the user interface that facilitates the user holding the mobile device with a comfortable grip pattern.

In some aspects, the techniques described herein relate to a mobile device, the operations further including disabling, responsive to determining that the user is holding the mobile device with the uncomfortable grip pattern, scrolling of the user interface via touch and swipe inputs.

In some aspects, the techniques described herein relate to a mobile device, wherein determining that the user is holding the mobile device with the uncomfortable grip pattern includes determining that a weight of the mobile device is at least partially supported by a finger of the user.

In some aspects, the techniques described herein relate to a mobile device, wherein the region of the user interface is out of reach for a thumb of the user while the weight of the mobile device is at least partially supported by the finger of the user.

In some aspects, the techniques described herein relate to a mobile device, the operations further including determining that the user interface includes one or more additional selectable user interface elements displayed outside the region; and moving, responsive to determining that the user is holding the mobile device with the uncomfortable grip pattern, the one or more additional selectable user interface elements within the region.

In some aspects, the techniques described herein relate to a mobile device, the operations further including determining, based on the sensor data, whether the mobile device is oriented with a portrait orientation or a landscape orientation, the region of the user interface being a first portion of the user interface based on the mobile device being oriented with the portrait orientation, and the region of the user interface being a second portion of the user interface based on the mobile device being oriented with the landscape orientation.

In some aspects, the techniques described herein relate to a mobile device, comprising: one or more sensors; a display device to display a user interface that includes one or more selectable user interface elements; and an ergonomic grip assistance system, implemented at least partially in hardware, to determine, based on sensor data collected by the one or more sensors, that the mobile device is held by a user with an ergonomically incorrect grip pattern; and move the one or more selectable user interface elements to a region of the user interface that facilitates the mobile device being held by the user with an ergonomically correct grip pattern.

The invention claimed is:

1. A mobile device comprising:
at least one memory; and
at least one processor coupled with the at least one memory and configured to cause the mobile device to:
  display a user interface that includes one or more selectable user interface elements;
  determine whether the mobile device is oriented with a portrait orientation or a landscape orientation;
  detect that the mobile device is being held by a user with an ergonomically incorrect grip pattern; and move, in response to the ergonomically incorrect grip pattern being detected, the one or more selectable user interface elements to a region that facilitates the user holding the mobile device with an ergonomically correct grip pattern, the region being different based on whether the portrait orientation or the landscape orientation is detected.

2. The mobile device of claim 1, wherein the at least one processor is further configured to cause the mobile device to determine that the user has held the mobile device with the ergonomically incorrect grip pattern for at least a threshold amount of time, and wherein the one or more selectable user interface elements are moved based on the mobile device having been held with the ergonomically incorrect grip pattern for at least the threshold amount of time.

3. The mobile device of claim 1, wherein the at least one processor is further configured to cause the mobile device to:
determine that the user has held the mobile device with the ergonomically incorrect grip pattern for at least a threshold amount of time;
display a prompt that is selectable to enable ergonomic grip assistance based on the mobile device having been held with the ergonomically incorrect grip pattern for at least the threshold amount of time; and
receive user input to the prompt enabling the ergonomic grip assistance, the one or more selectable user interface elements being moved based on the user input.

4. The mobile device of claim 3, wherein the threshold amount of time is a threshold percentage of time that the mobile device is actively being used.

5. The mobile device of claim 1, wherein the ergonomically incorrect grip pattern is detected based on sensor data collected by sensors of the mobile device, the sensor data including at least one of touch data indicating locations in the user interface where touch events are received, pressure data indicating a pressure applied to the mobile device at different portions of the ergonomically incorrect grip pattern, and key press data indicating a pressure applied to the mobile device to one or more keys of the mobile device.

6. The mobile device of claim 1, wherein the at least one processor is further configured to cause the mobile device to determine the region of the user interface based on touched locations that are out of reach for a hand of the user holding the mobile device with the ergonomically incorrect grip pattern.

7. The mobile device of claim 6, wherein to determine the region of the user interface, the at least one processor is further configured to cause the mobile device to determine a first region of the user interface based on first touched locations that are out of reach for the hand of the user holding the mobile device with the ergonomically incorrect grip pattern in the portrait orientation, the one or more selectable user interface elements being moved to the first region based on the mobile device being held with the ergonomically incorrect grip pattern in the portrait orientation.

8. The mobile device of claim 7, wherein to determine the region of the user interface, the at least one processor is further configured to cause the mobile device to determine a second region of the user interface based on second touched locations that are out of reach for the hand of the user holding the mobile device with the ergonomically incorrect grip pattern in the landscape orientation, the one or more selectable user interface elements being moved to the second region based on the mobile device being held with the ergonomically incorrect grip pattern in the landscape orientation.

9. The mobile device of claim 6, wherein the touched locations represent locations on a display screen of the mobile device which caused the user to release the ergonomically incorrect grip pattern in order to subsequently touch the touched locations.

10. The mobile device of claim 6, wherein the touched locations represent locations on a display screen of the mobile device which caused the user to touch the touched locations with an additional hand that is not holding the mobile device with the ergonomically incorrect grip pattern.

11. The mobile device of claim 6, wherein the touched locations represent locations on a display screen of the mobile device which caused the user to remove the hand from the mobile device held with the ergonomically incorrect grip pattern and use the removed hand to touch the locations.

12. The mobile device of claim 1, wherein the at least one processor is further configured to cause the mobile device to cause the mobile device to:
detect that the user is interacting with the user interface by scrolling via one or more touch and swipe inputs; and
display one or more additional user interface elements that are selectable to enable scrolling of the user interface, the one or more additional user interface elements displayed in the region.

13. The mobile device of claim 12, wherein the one or more additional user interface elements include a first user interface element selectable to scroll the user interface in an upward direction, and a second user interface element selectable to scroll the user interface in a downward direction.

14. The mobile device of claim 13, wherein the first and second user interface elements are displayed along a same edge of the user interface based on the mobile device being oriented with the portrait orientation, and the first and second user interface elements are displayed along opposite edges of the user interface based on the mobile device being oriented with the landscape orientation.

15. A mobile device comprising:
a display screen;
at least one memory; and
at least one processor coupled with the at least one memory and configured to cause the mobile device to:
receive sensor data that includes touched locations of the display screen that are out of reach for a hand of a user holding the mobile device with an ergonomically incorrect grip pattern;
determine a region of the display screen that facilitates the user holding the mobile device with an ergonomically correct grip pattern based on the touched locations;
detect, while the display screen displays a user interface that includes one or more selectable user interface elements, that the user is holding the mobile device with the ergonomically incorrect grip pattern; and
move, in response to the ergonomically incorrect grip pattern being detected, the one or more selectable user interface elements to the region of the display screen.

16. The mobile device of claim 15, wherein the at least one processor is further configured to cause the mobile device to determine whether the mobile device is oriented with a portrait orientation or a landscape orientation, the region being different based on whether the portrait orientation or the landscape orientation is detected.

17. The mobile device of claim 15, wherein the touched locations represent locations on the display screen of the mobile device which caused the user to release the ergonomically incorrect grip pattern in order to subsequently touch the touched locations.

18. The mobile device of claim 15, wherein the touched locations represent locations on the display screen of the mobile device which caused the user to touch the touched locations with an additional hand that is not holding the mobile device with the ergonomically incorrect grip pattern.

19. The mobile device of claim 15, wherein the touched locations represent locations on the display screen of the mobile device which caused the user to remove the hand from the mobile device held with the ergonomically incorrect grip pattern and use the removed hand to touch the locations.

20. A method comprising:
- displaying a user interface of a mobile device that includes one or more selectable user interface elements;
- determining whether the mobile device is oriented with a portrait orientation or a landscape orientation;
- detecting that a user is holding the mobile device with an uncomfortable grip pattern; and
- moving the one or more selectable user interface elements to a region that facilitates the user holding the mobile device with a comfortable grip pattern, the region being different based on whether the portrait orientation or the landscape orientation is detected.

* * * * *